(12) United States Patent
Rotsten et al.

(10) Patent No.: US 8,462,798 B2
(45) Date of Patent: Jun. 11, 2013

(54) MULTIPLEXING MEDIA COMPONENTS OF DIFFERENT SESSIONS

(75) Inventors: Kirsi Rotsten, Espoo (FI); Erdei Erzsebet, Budapest (HU); Jukka Hongisto, Helsinki (FI); Zhi-Chun Honkasalo, Kauniainen (FI); Seppo Huotari, Espoo (FI); Juha Rasanen, Espoo (FI); Lauri Lahtinen, Espoo (FI); Miikka Poikselka, Espoo (FI); Markku Vimpari, Oulu (FI); Robert Sugar, Budapest (HU); Marco Stura, Espoo (FI); Juha Pekka, HML (FI); Anne Narhi, Tampere (FI); Balazs Bertenyi, Budapest (HU); Inmaculada Carrion Rodrigo, Helsinki (FI)

(73) Assignee: Nokia Corporation, Espoo (FI)

( * ) Notice: Subject to any disclaimer, the term of this patent is extended or adjusted under 35 U.S.C. 154(b) by 1133 days.

(21) Appl. No.: 12/379,984

(22) Filed: Mar. 5, 2009

(65) Prior Publication Data

US 2009/0213794 A1 Aug. 27, 2009

Related U.S. Application Data

(63) Continuation of application No. 10/838,362, filed on May 5, 2004, now Pat. No. 7,522,613.

(30) Foreign Application Priority Data

| May 7, 2003 | (EP) | ................................. 03010272 |
| Sep. 8, 2003 | (EP) | ................................. 03020285 |
| Feb. 5, 2004 | (EP) | ................................. 04002552 |

(51) Int. Cl.
*H04L 12/28* (2006.01)

(52) U.S. Cl.
USPC ...... 370/400; 370/390; 455/414.1; 455/435.1

(58) Field of Classification Search
USPC .................. 370/400, 352, 260, 390; 455/518, 455/414.1, 435.1
See application file for complete search history.

(56) References Cited

U.S. PATENT DOCUMENTS

| 6,009,469 A | 12/1999 | Mattaway et al. |
| 7,170,863 B1 | 1/2007 | Denman et al. |

(Continued)

FOREIGN PATENT DOCUMENTS

| DE | 10046345 A1 | 3/2002 |
| WO | WO 01/67675 A2 | 9/2001 |
| WO | WO 02/104046 A1 | 12/2002 |

OTHER PUBLICATIONS

3GPP TS 23.228 V5.10.0 (Sep. 2003); 3RD Generation Partnership; Technical Specification Group Services and System Aspects; IP Multimedia Subsystem (IMS); Stage 2 (Release 5).

(Continued)

*Primary Examiner* — Gerald Gauthier
*Assistant Examiner* — Simon King
(74) *Attorney, Agent, or Firm* — Mintz, Levin, Cohn, Ferris, Glovsky & Popeo, P.C.

(57) ABSTRACT

An apparatus and a method are provided for multiplexing different sessions using the same authorized contexts for media. The method includes distinguishing different control plane sessions by a user equipment, and identifying media flows of a same application among the different control plane sessions by the user equipment by setting a service identifier. The method further includes sending the service identifier by the user equipment to a call state control function including a policy decision function, and authorizing quality of service for a user plane context by the policy decision function. Furthermore, the method includes enabling, by the policy decision function based on the service identifier, the different control plane sessions with media flows of the same application to share the same user plane context with the authorized quality of service to multiplex the different control plane sessions with media flows of the same application.

11 Claims, 12 Drawing Sheets

U.S. PATENT DOCUMENTS

| | | | |
|---|---|---|---|
| 2002/0032800 A1 | 3/2002 | Puuskari et al. | |
| 2002/0037735 A1 | 3/2002 | Maggenti et al. | |
| 2003/0131151 A1* | 7/2003 | Roach et al. | 709/328 |
| 2004/0198376 A1 | 10/2004 | Chandhok et al. | |
| 2005/0210141 A1* | 9/2005 | Oyama et al. | 709/228 |

OTHER PUBLICATIONS

3GPP TS 23.060 V6.2.0 (Sep. 2003); 3RD Generation Partnership Project; Technical Specification Group Services and System Aspects; General Packet Radio Service (GPRS); Service Description; Stage 2 (Release 6).

3GPP TS 25.413 V5.6.0 (Sep. 2003); 3RD Generation Partnership Project; Technical Specification Group Radio Access Network; UTRAN Iu interface RANAP signalling (Release 5).

3GPP TS 29.061 V5.7.0 (Sep. 2003); 3RD Generation Partnership Project; Technical Specification Group Core Network; Technical Specification Group Core Network; Interworking between the Public Land Mobile Network (PLMN) supporting packet based services and Packer Data Networks (PDN) (Release 5).

3GPP TS 29.208 V5.5.0 (Sep. 2003); 3RD Generation Partnership Project; Technical Specification Group Core Network; End-to-end Quality of Service (QoS) signalling flows (release 5).

3GPP TS 29.207 V5.3.0 (Mar. 2003); 3RD Generation Partnership Project; Technical Specification Group Core Network; Policy Control Over Go Interface (Release 5).

3GPP TS 24.229 V5.6.0 (Sep. 2003); 3RD Generation Partnership Project; Technical Specification Group Core Network; IP Multimedia Call Control Protocal based on Session Initiation Protocol (SIP) and Session Description Protocol (SDP); Stage 3 (Release 5).

3GPP TS 24.228 V5.6.0 (Sep. 2003); 3RD Generation Partnership Project; Technical Specification Group Core Network; Signalling flows for the IP multimedia call control based on SIP and SDP; Stage 3 (Release 5).

3GPP TS 23.207 V6.0.0 (Sep. 2003); 3RD Generation Partnership Project; Technical Specification Group Services and System Aspects; end-to-End Quality of Service (QoS) concept and architecture (Release 6).

Rosenberg et al., "Caller Preferences and Callee Capabilities for the Session Initiation Protocol", Mar. 2, 2003, pp. 1 to 55.

3GPP TS 24.229 V5.4.0 (Mar. 2003); 3RD Generation Partnership Project; Technical Specification Group Core Network; IP Multimedia Call Control Protocol based on SIP and SDP; Stage 3 (Release 5).

3GPP TSG-SA WG2 meeting #23; Feb. 18-22, 2002; "Number of media components per PDP Context"; Tdoc S2-020493.

3GPP TSG-CN WG3#23; May 13-17, 2002, "LS on distribution of IMS charging ID (ICID) from PCF/P-CSCF to GGSN" Tdoc N3-020507.

3GPP TR 23.8xx V0.3.0 (Mar. 2003); Technical Specification Group Services and System Aspects; Overall Architecture Aspects of IP Flow Based Bearer Level Charging; Stage 2, (Release 6) with Redlined Version.

3GPP TS 22.115 6.0.0 (Mar. 2003); Technical Specification Group Services and System Aspects; Service Aspects; Charging and Billing (Release 6).

3GPP TS 32.225 V5.2.0 (Mar. 2003); Technical Specification Group Service and System Aspects; Telecommunication Management; Charging Management; Charging Data Description for the IP Multimedia Subsystem (IMS) (Release 5).

3GPP TS 29.207 V5.3.0 (Mar. 2003); Technical Specification Group Core Network; Policy Control Over Go Interface; (Release 5).

* cited by examiner

MULTIPLEXING MEDIA COMPONENTS OF DIFFERENT SESSIONS

REFERENCE TO RELATED APPLICATIONS

This is a continuation application of U.S. patent application Ser. No. 10/838,362, filed on May 5, 2004, now U.S. Pat. No. 7,522,613, which claims priority of European Patent Application No. 03010272.7, filed on May 7, 2003, European Patent Application No. 03020285.7, filed on Sep. 8, 2003, and European Patent Application No. 04002552.0, filed on Feb. 5, 2004. The subject matter of the earlier filed applications are hereby incorporated by reference.

FIELD

Embodiments of the invention relate to a method of multiplexing media components of different sessions. Embodiments of the invention also relates to a system, a User Equipment (UE) and a server for multiplexing media components of different sessions, respectively.

As a general new innovation for all IMS-services (including end-to-end services and different application user agent-client services), an embodiment of the invention finds exemplary usage in "Push to talk over Cellular" (PoC) services.

RELATED BACKGROUND ART

It is expected that various types of services are to be provided by means of different Application Servers (AS) over IMS systems. An example of the AS service is the "Push to talk over Cellular" (PoC) service, also known as PTT, Push-To-Talk service.

The service Push to talk over Cellular (PoC) is a direct voice service over the General Packet Radio Service (GPRS). The technology uses the capabilities of the IP Multimedia Subsystem (IMS) as specified by the $3^{rd}$ Generation Partnership Project (3GPP) for enabling IP connections between mobile phones. The push-to-talk service is a two-way form of communication that allows users to immediately engage in a communication with one or more receivers, similar to a Walkie Talkie, simply by pushing a button on their handsets.

On the other hand, Push to talk over Cellular (PoC) calls are a one-way communication: while one person speaks, the other(s) listen(s). The turn to speak is requested e.g. by pressing the special "PTT" or "tangent" key and granted on a first come first served basis. Users can join the group session they wish to talk to and then press the tangent key to start talking.

In order to be able to communicate in a group session, a user needs to be an active member of that group session. A user becomes an active member of a group session by joining the group session. The user can be joined to several group sessions at a time. The amount of simultaneous group attachments is configurable by the operator and their maximum number may also vary according to the Push to talk over Cellular (PoC) server vendor from a couple to even twenty. It is intended that each Push to talk over Cellular (PoC) group attachment has to establish an own Session Initiation Protocol session (hereinafter referred to as SIP session) on the control plane.

In release 5 of the 3GPP (and forward), the principle is that the controlling SIP sessions are used to bind to the user plane connection in order to provide e.g. charging correlation information. In release 5 of the 3GPP (and forward) the binding is done by the Go-interface. As a result, there should be as many PDP contexts in the packet core as there are SIP sessions on the control plane, if the bearer authorization needs to be done.

It is not possible to re-use an existing PDP context, except when a "best-effort" PDP context is used and the authorization is not required.

Since the control plane and user plane connection binding (the support of Go interface) is not defined in the packet core environment of the $2^{nd}$ generation, and thus the binding of SIP sessions on the control plane with the bearer carrying the media flows on the user plane is not applicable, the Push to talk over Cellular (PoC) User Equipment (UE) may re-use the same PDP context at its own discretion.

However, after a 3GPP release 5 environment, the problem is completely new where the binding mechanism (Go-interface) offers the means for bearer authorization, but it is stated that media flows of different SIP sessions cannot be multiplexed in the same PDP context, since the release 5 does not define any solution to this problem. The Go-interface is, however, optional to deploy in the network. Then, it is always possible to let the bearer without authorization, and re-use the "best-effort" PDP context.

Of course, it would be possible to use just one controlling SIP session for all Push to talk over Cellular (PoC) group calls and one-to-one sessions and just modify its media parameters when needed (target ports accordingly to connections etc.), but it would cause problems, for example, when only one group attachment is possible, and the existing group call is forced to release when the user joins a new group.

The Push to talk over Cellular (PoC) User Equipment (UE) and the packet core of the network cannot currently allocate and maintain many (e.g. ten or fifteen) simultaneous Packet Data Protocol contexts (hereinafter referred to as PDP contexts). According to present knowledge, the first industry standard compliant Push to talk over Cellular (PoC) User Equipment (UE) to come shall support only one PDP context of streaming or interactive class. Further, the packet core supports only a couple (currently up to six or eight) of active secondary PDP contexts for each User Equipment (UE). Thus, maintaining many real-time PDP contexts for every Push to talk over Cellular (PoC) subscriber at the same time would bind a lot of packet core and radio resources. Still, the Push to talk over Cellular (PoC) user could hear only one media from one session at a time. On the other hand, several Push to talk over Cellular (PoC) group attachments are required to provide adequate Push to talk over Cellular (PoC) services.

SUMMARY

Accordingly, it is an object of embodiments of the invention to provide a method and an an apparatus, which avoid the shortcomings stated above.

Thus, in accordance with an embodiment of the invention, there is provided a method. The method includes distinguishing different control plane sessions by a user equipment, identifying media flows of a same application among the different control plane sessions by the user equipment by setting a service identifier, and sending the service identifier by the user equipment to a call state control function comprising a policy decision function. The method further includes authorizing quality of service for a user plane context by the policy decision function, and enabling, by the policy decision function based on the service identifier, the different control plane sessions with media flows of the same application to share the same user plane context with the authorized quality of service to multiplex the different control plane sessions with media flows of the same application.

In accordance with an embodiment of the invention, there is provided an apparatus. The apparatus includes a distinguishing processor configured to distinguish different control plane sessions, and an identification processor configured to identify media flows of a same application among the different control plane sessions by setting a service identifier. The apparatus further includes an address processor configured to address the service identifier to a policy decision function.

In accordance with an embodiment of the invention, there is provided a method. The method includes distinguishing different control plane sessions by a user equipment, and identifying media flows of a same application among the different control plane sessions by the user equipment by setting a service identifier. The method further includes addressing the service identifier to a policy decision function.

In accordance with an embodiment of the invention, there is provided an apparatus. The apparatus includes a processor configured to authorize quality of service for a user plane context. The apparatus further includes a multiplexer configured to enable, based on a service identifier, different control plane sessions with media flows of a same application to share the same user plane context with the authorized quality of service to multiplex the different control plane sessions with media flows of the same application.

In accordance with an embodiment of the invention, there is provided a method. The method includes authorizing quality of service for a user plane context by a policy decision function. The method further includes enabling with a multiplexer, by the policy decision function based on a service identifier, different control plane sessions with media flows of a same application to share the same user plane context with the authorized quality of service to multiplex the different control plane sessions with media flows of the same application.

In accordance with an embodiment of the invention, there is provided an apparatus. The apparatus includes means for distinguishing different control plane sessions, and means for identifying media flows of a same application among the different control plane sessions by setting a service identifier. The apparatus further includes means for addressing the service identifier to a policy decision function.

In accordance with an embodiment of the invention, there is provided an apparatus. The apparatus includes means for authorizing quality of service for a user plane context. The apparatus further includes means for enabling, based on a service identifier, different control plane sessions with media flows of a same application to share the same user plane context with the authorized quality of service to multiplex the different control plane sessions with media flows of the same application.

In accordance with an embodiment of the invention, there is provided a computer program embodied on a computer readable storage medium. The computer program is configured to control a processor to perform a process. The process includes distinguishing different control plane sessions by a user equipment, and identifying media flows of a same application among the different control plane sessions by the user equipment by setting a service identifier. The process further includes sending the service identifier by the user equipment to a call state control function comprising a policy decision function, and authorizing quality of service for a user plane context by the policy decision function. Further, the process includes enabling, by the policy decision function based on the service identifier, the different control plane sessions with media flows of the same application to share the same user plane context with the authorized quality of service to multiplex the different control plane sessions with media flows of the same application.

In accordance with an embodiment of the invention, there is provided a computer program embodied on a computer readable storage medium. The computer program is configured to control a processor to perform a process. The process includes distinguishing different control plane sessions by a user equipment, and identifying media flows of a same application among the different control plane sessions by the user equipment by setting a service identifier. The process further includes addressing the service identifier to a policy decision function.

In accordance with an embodiment of the invention, there is provided a computer program embodied on a computer readable storage medium. The computer program is configured to control a processor to perform a process. The process includes authorizing quality of service for a user plane context by a policy decision function. The process further includes enabling with a multiplexer, by the policy decision function based on a service identifier, different control plane sessions with media flows of a same application to share the same user plane context with the authorized quality of service to multiplex the different control plane sessions with media flows of the same application.

Further details of certain embodiments of an embodiment of the invention are according to the following description of the preferred embodiments of the invention.

Accordingly, embodiments of the invention may contain a solution, which enables optimized radio and packet core resource usage by reducing the amount of PDP contexts without having to drop any SIP session from the control level. Further, the Go interface is not affected so that the invention remains compliant to the 3GPP release five regarding the interface between the Policy Decision Function (PDF) and the Gateway GPRS Support Node (GGSN).

The advantages of a PDP context re-usage are that the use of multiple media contexts is simply not possible in the first phase of Push to talk over Cellular (PoC) service (when media authorization is supported). That is, there is only one streaming class PDP context on the Push to talk over Cellular (PoC) User Equipment (UE) in the first phase, so that the invention offers a solution.

Note, if there is no media authorization the UE may re-use the same PDP context with "best-effort QoS" to carry all the traffic of the controlling SIP sessions.

The PDP context re-usage optimizes the use of radio resources and packet core network resources. For instance, five Push to talk over Cellular (PoC) sessions adopting the invention would use just 20% of the radio resources and packet core resources in comparison to a normal session establishment.

The PDP context re-usage gives a great benefit for Push to talk over Cellular (PoC) subscriber. Otherwise, the several Push to talk over Cellular (PoC) sessions (like more than ten of them) would be totally impossible to handle for the User Equipment (UE).

One of the goals of the Push to talk over Cellular (PoC) service is to bring the push-to-talk facility into conventional cellular phones. The concept offers User Equipment (UE) manufacturers an opportunity to implement the push-to-talk facility across mobile phone categories, thus offering end-users more freedom to choose products that best meet their communication needs.

BRIEF DESCRIPTION OF THE DRAWINGS

These and other details and advantages of embodiments of the invention will become more fully apparent from the following detailed description of the preferred embodiments which is to be taken in conjunction with the appended drawings, in which.

DETAILED DESCRIPTION OF THE PREFERRED EMBODIMENTS

Generally, embodiments of the invention can be applied to all IMS services, which use an authorized PDP context for media such as, for example, some game sessions.

In the following, scenarios from the Push to talk over Cellular (PoC) service are used by way of example only. It is to be explicitly noted that the following description of the preferred embodiments of the invention is presented by way of explanation in order to facilitate the understanding of the invention. However, the following description is by no means intended to limit the invention to the depicted embodiments.

According to an embodiment of the invention, the same PDP context is shared by all sessions related to the same application. In the following three alternatives of how to control this session multiplexing are presented. The first is that the Policy Decision Function (PDF) has the control of the session multiplexing function, the second is that the User Equipment (UE) has the control of the session multiplexing function; the third option is that, the UE supports the session multiplexing functions by default (for pre-defined services) and the network makes a decision whether support the session multiplexing or not.

Thus, taking the example of Push to talk over Cellular, the principle is that a Push to talk over Cellular (PoC) user is able to establish as many simultaneous controlling SIP sessions as there are attachments in the IP Multimedia Subsystem (IMS). However, the media connections are always grouped together such that their transfers alternate from each other. Consequently, it would be a waste of network resources to reserve several PDP contexts especially for this kind of special multiplexed media type.

Figure 1:
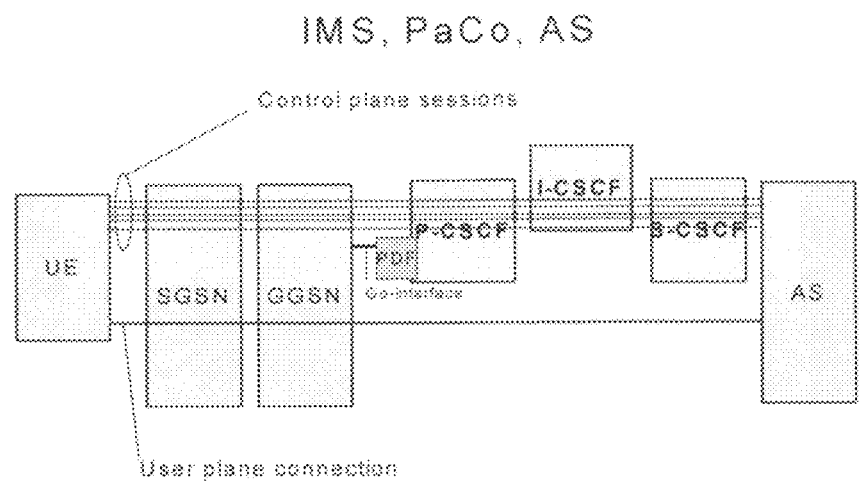
FIG. 1 shows an example of the user plane re-usage according to an embodiment of the invention.

This principle is depicted in FIG. 1, which shows a user plane re-usage according to the invention.

Specifically, there is shown a controlling SIP session (see arrow) between a User Equipment (ULE), a Proxy Call State Control Function (P-CSCF), (an Interrogating Call State Control Function (I-CSCF)), a Serving Call State Control Function (S-CSCF) and a Push to talk over Cellular (PoC) application server. The Push to talk over Cellular (PoC) application server manages the traffic so that there is always just one-way traffic from/to one session. The traffic of the controlling SIP sessions use the same user plane connection (PDP context). Additionally, some of the embodiments can be also applied for end-to-end services. In these cases, a Proxy Call State Control Function (with PDF) and User Equipment (UE) shall control the session multiplexing function.

According to the above stated first alternative of the invention, there is a new session control mechanism to the Proxy Call State Control Function (P-CSCF). Whereas, according to the above stated second alternative of the invention, the session control mechanism could also be part of the User Equipment (UE).

As a consequence, new requirements for a Push to talk over Cellular PoC enabled User Equipment (UE), a Push to talk over Cellular PoC application server and the CSCFs are brought forward.

In the following, the above former case is described first, wherein the above latter case is describe later on, particularly in connection with the fourth embodiment of the invention.

As indicated in FIG. 1, a Policy Decision Function (PDF) is a logical entity of the Proxy Call State Control Function (P-CSCF). The Policy Decision Function (PDF) is a logical policy decision element, which uses standard IP mechanisms to implement a Service Based Local Policy (SBLP) in the IP bearer layer. The Policy Decision Function (PDF) makes policy decisions based on information obtained from the Proxy Call State Control Function (P-CSCF). In the Policy Decision Function (PDF) of the Proxy Call State Control Function (P-CSCF), the application level parameters (e.g. Session Description Protocol (SDP)) are mapped into IP Quality of Service (QoS) parameters.

The problem is that the Policy Decision Function (PDF) in the Proxy Call State Control Function (P-CSCF) according to the release 5 standard creates a Token to control the media bearer during the media authorization. In order to re-use the same user plane connection whenever the caller sends the request to talk, the invention is applicable and required.

When applied to the Push to talk over Cellular (PoC) service, the invention can comprise the following aspects.

A User Equipment (UE) sets a service indication to all service relating requests in order to distinguish them among other user requests e.g. the PoC enabled User Equipment (UE) sets a Push to talk over Cellular (PoC) service indication (e.g. the feature tag defined in Industry standard of PoC) to all Push to talk over Cellular (PoC) relating requests. The Push to talk over Cellular (PoC) activities like group attachment and one-to-one communication establishment create a new SIP session in the control plane. The Push to talk over Cellular (PoC) server may use different port numbers to indicate the media flows of different Push to talk over Cellular (PoC) sessions (separate groups in which the user has joined in or one-to-one communication sessions), or alternatively, the Push to talk over Cellular (PoC) server may use an application layer indication (e.g. a multiplexing indicator in the data field header), and in this case only one port number will be needed. As explained in the following, according to the invention both scenarios are possible (which are called wildcard and filtering). These Push to talk over Cellular (PoC) related sessions shall be able to share the same PDP context, whose authorization is, in case of the first alternative of the invention, controlled by the Policy Decision Function (PDF) through the use of either a single authorization Token, or else multiple related Tokens, wherein details are described in the following description of the embodiments. The operator can also define the Policy Decision Function (PDF) in order to use more than one PDP context: for example, one for one-to-one sessions and another for group communication. As stated above, the authorization to share the same PDP context can also be moved to the User Equipment (UE), which is the second alternative according to the invention.

It is an assumption of the invention that the Push to talk over Cellular (PoC) server shall provide a scheduling mechanism such that the multiple related session traffic will share the PDP context in time division manner, so that the authorized bearer bandwidth (i.e. guaranteed bit rate) is equal to the maximum bandwidth of all the related sessions, not the sum of the bandwidths of the individual sessions. The details of such scheduling method are however not described here.

As stated above, all Push to talk over Cellular (PoC) related sessions of the same subscriber shall use the same secondary PDP context by shifting or alternating the media in it. The Quality of Service (QoS) of sessions is the same. Depending on the User Equipment (UE), the Quality of Service (QoS) for Push to talk over Cellular (PoC) services is either streaming or best effort kind of Quality of Service (QoS). Because the traffic of the multiplexed sessions is managed by the subscriber's Push to talk over Cellular (PoC) application server, it makes sure that only one session is transmitting traffic in just one-way at a time. Because of this same reason, the Quality of Service (QoS) of sessions shall not be summed for sessions. For end-to-end services the User Equipment UE shall control the session multiplexing function and make decision which sessions have enough similar bandwidth requirement.

All the initiative Push to talk over Cellular (PoC) requests like session establishment requests (both User Equipment (UE) originating and Push to talk over Cellular (PoC) server originating requests) shall contain application specific indication. This indication may be located in a Session Description Protocol (SDP) payload or in a SIP header as a caller preference indication. This patent is not specifying the exact value of the service specific caller preference indication. In industry standard of PoC (release one) defines the value of feature tag for PoC shall be +g.poc.talkburst="TRUE". This indication is to distinguish application specific requests among others session requests of the user. This may be also used e.g. for filtering purposes (to route the requests). This indication may be used also in order to control the media authorization mechanism for Push to talk over Cellular (PoC) in the Policy Decision Function (PDF).

The following embodiments do not require any changes to the Common Open Policy Service (COPS) protocol or the Go-interface mechanisms. A pre-condition for all of these embodiments is that a PDP context is already established.
Embodiment 1: A New Media Component Adding According to the first embodiment of the invention, each new Push to talk over Cellular (PoC) session is considered as a new media component adding to the same PDP context.

The PDF can define some way to bind the sessions to the same PDP context, which however is a pure question of the implementation for the Policy Decision Function (PDF). The PDF shall define a way to bind the sessions to the same PDP context, which however is a pure question of the implementation for the Policy Decision Function (PDF).

One solution option is that the same Authorization Token can be sent as an indication for all the SIP session to be multiplexed to use the same PDP context (not recommended solution). Normally, the User Equipment (UE) receives new binding information for each IP Multimedia Subsystem (IMS) session. In this option, the embodiment requires that the User Equipment (UE) shall allow that it receives the same binding id for several controlling sessions. In other words, the Proxy Call State Control Function (P-CSCF) sends an indication to the User Equipment (UE) to group the media to the same Token (to use the same PDP context) as earlier. Since the User Equipment (UE) is a dedicated Push-over-Cellular Push to talk over Cellular (PoC) enabled User Equipment (UE), this is not a problem at all. Reference is made again to FIG. 3, where the information hierarchy of the User Equipment (UE) is shown.

Another solution is that PDF shall always generate the new Authorization Token for each user's session, but it shall contain the same identifier, e.g. the ID of their common Policy Decision Function (PDF) instance for multiple sessions.

Figure 2:
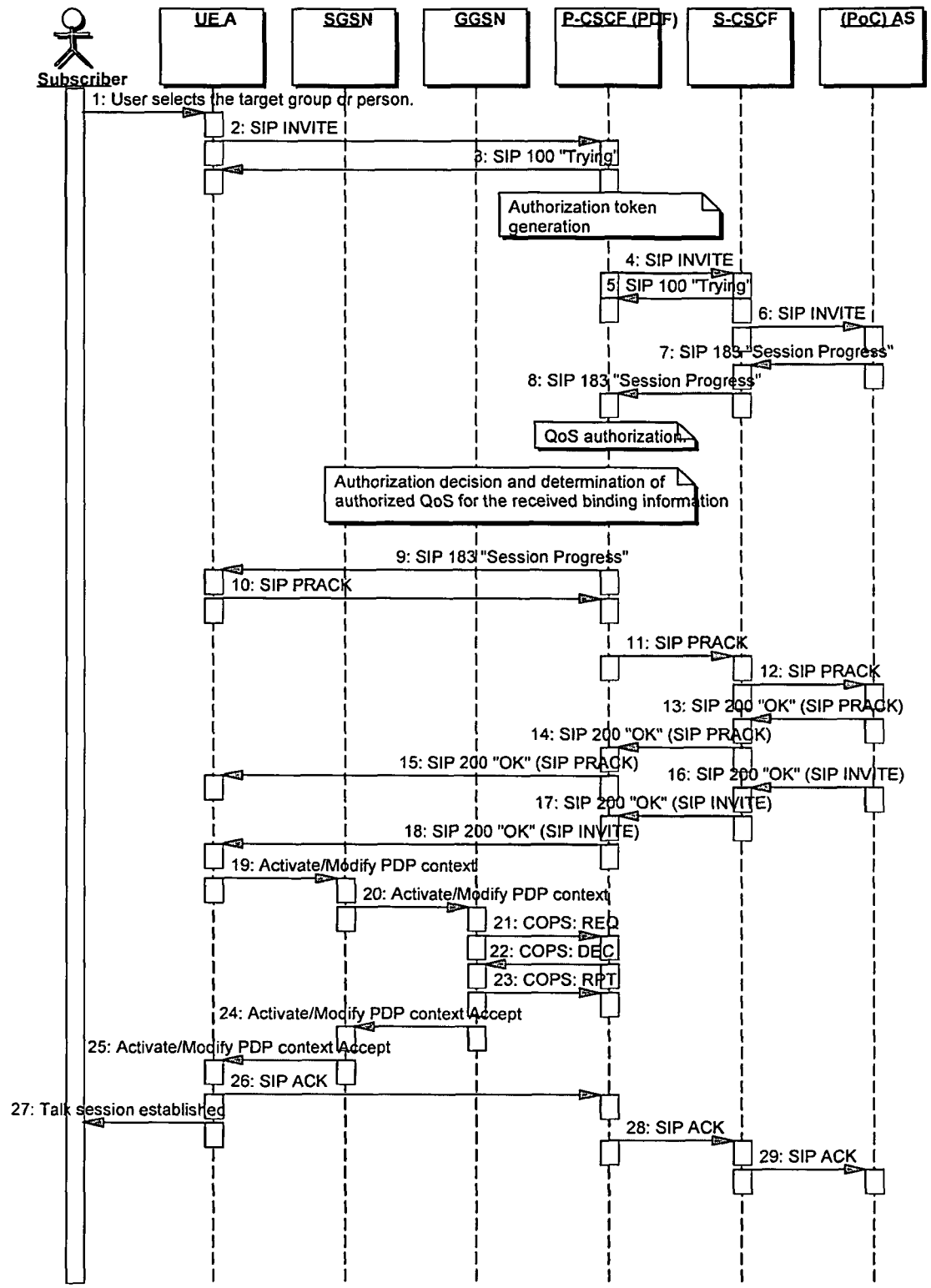
FIG. 2 shows a signaling flow of the first embodiment of the invention where each new Push to talk over Cellular (PoC) session is seen as a new media component adding, and of the third embodiment of the invention where a port number is filtered, and for the fourth embodiment of the invention, where the User Equipment (UE) takes care of the multiplexing support.

The Authorization Token contains the media grouping information. The procedure of the embodiment is depicted in FIG. 2 (and FIG. 3).

Accordingly, with the message 1 the user selects the target user for a personal Push to talk over Cellular (PoC) communication or a Push to talk over Cellular (PoC) group to be as a recipient.

With message 2, a session is established by sending "SIP INVITE" by the Push to talk over Cellular (PoC) enabled User Equipment (UE).

The Proxy Call State Control Function (P-CSCF) may automatically send "SIP 100" (Trying) as message 3 to the User Equipment (UE).

The Policy Decision Function (PDF) shall know whether the user has other ongoing SIP session relating to the same application originating from the same User Equipment (UE) or if there are terminating application related sessions (in this case the PDF shall know whether the user has other ongoing Push to talk over Cellular (PoC) sessions originating from the same User equipment (UE) or if there are terminating Push to talk over Cellular (PoC) sessions).

In order to gather this information, it is required that the same Policy Decision Function (PDF) instant (in Proxy Call State Control Function) is used for all of the application related SIP sessions. This can be guaranteed e.g. when the Policy Decision Function (PDF) instance can add its own identifier to be a part of the Authorization Token. Also the Policy Decision Function (PDF) shall identify the sessions by the originating User Equipment (UE).

In order to distinguish the sessions to be multiplexed according the application, the User Equipment (UE) shall add some kind of application specific indication or general session multiplexing indication to each SIP session request to be multiplexed to use the same PDP context.

Further, the Policy Decision Function (PDF) in Proxy Call State Control Function (P-CSCF) and the User Equipment (UE) shall know if there are currently other ongoing SIP sessions e.g. Push to talk over Cellular (PoC) sessions (originating from or terminating to the same User Equipment (UE)). In addition, the Policy Decision Function (PDF) (in Proxy Call State Control Function (P-CSCF)) (shall store the binding information of each Push to talk over Cellular (PoC) session e.g. to the local memory area. Whenever the Proxy Call State Control Function (P-CSCF) (Policy Decision Function (PDF)) receives a Push to talk over Cellular (PoC) specific session establishment request, it shall increase its "session counter" (In other words, the Proxy Call State Control Function (P-CSCF) counts the Push to talk over Cellular (PoC) sessions of the same originating User Equipment (UE)).

With message 4, the Proxy Call State Control Function (P-CSCF) sends "INVITE" to the Serving Call State Control Function (S-CSCF).

Referring to message 8, the Proxy Call State Control Function (P-CSCF) (Policy Decision Function (PDF)) does not re-calculate the Quality of Service (QoS) parameters normally, since the sessions shall not transmit simultaneously and the Quality of Service (QoS) for Push to talk over Cellular (PoC) is most likely to be the same (for audio it is always the same).

It is remarked that when all sessions have the same QoS requirement and they are not transmitting simultaneously, the QoS is not re-calculated.

If in the cases where a specific Push to talk over Cellular (PoC) session requires a higher authorized guaranteed bit rate (in future e.g. for video streams), then the Policy Decision Function (PDF) can update the Quality of Service (QoS) authorization accordingly, using the release 5 (and forward) compliant Go-interface.

Figure 3:
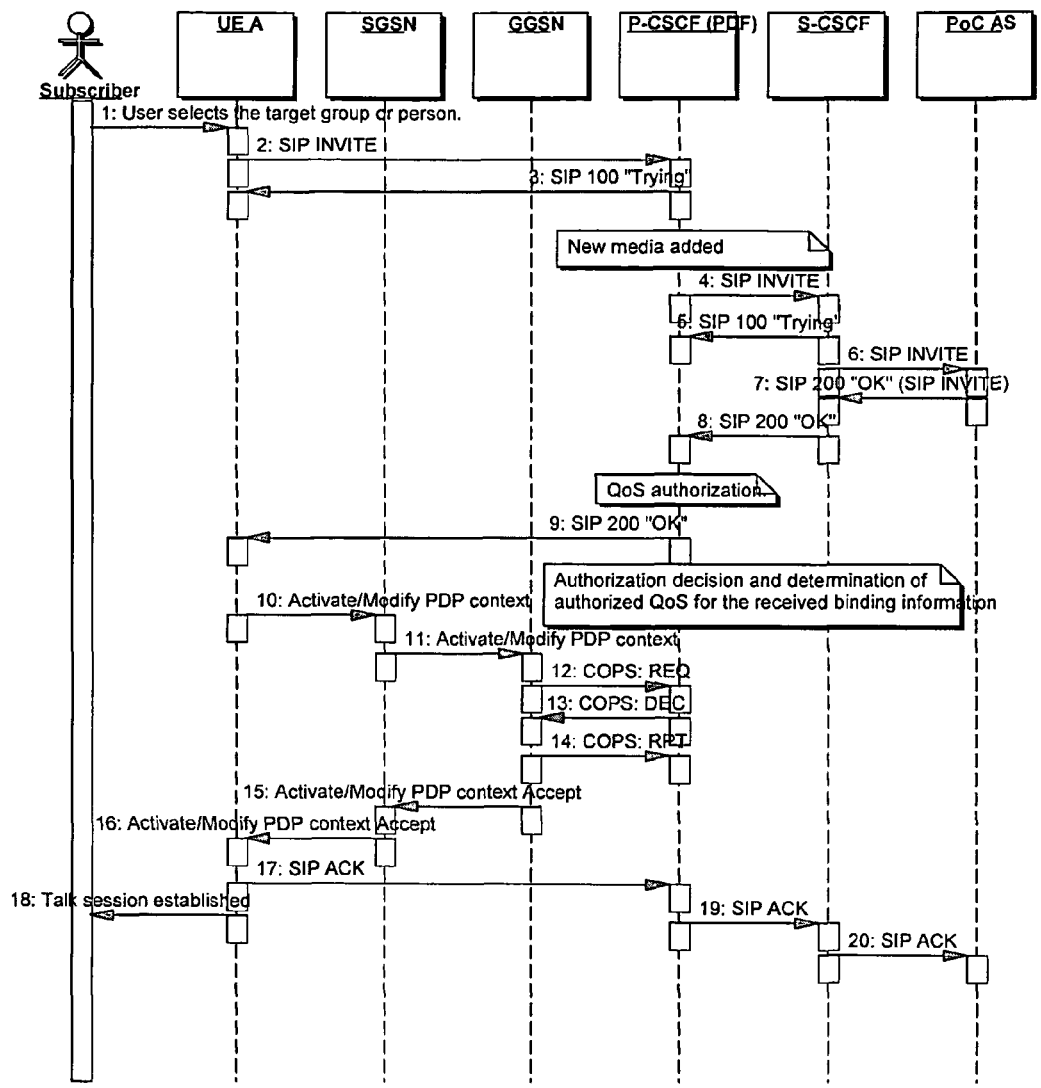
FIG. 3 shows a case where the UE/network is not supporting precondition requirements (e.g. the industry standard of PoC release 1.0 compliant UEs). The present signaling flow is the same for the first embodiment of the invention, where each new Push to talk over Cellular (PoC) session is seen as a new media component adding; and it is the same for the third embodiment of the invention, where a port number is filtered, and for the fourth embodiment of the invention, where the User Equipment (UE) takes care of the multiplexing support.

With message 9, The Proxy Call State Control Function (P-CSCF) shall send the same media authorization header to the Push to talk over Cellular (PoC) enabled User Equipment (UE) in "SIP 183" (Session progress) or if the UE or network is not supporting precondition requirements, the media authorization header shall be sent later in final SIP 2xx (SIP 200 "OK" or SIP 202 "Accepted") response (in message 9 in FIG. 3).

The Proxy Call State Control Function (P-CSCF) (Policy Decision Function (PDF)) may use the same Authorization Token for all SIP sessions, so they are seen to be as one session on the Gateway GPRS Support Node (GGSN); or the Proxy Call State Control Function (P-CSCF) (Policy Decision Function (PDF)) may send a new Authorization Token with the same identifier, e.g. the ID of their common Policy Decision Function (PDF) instance of multiplexed sessions with specific binding information. According to the invention, the exact binding mechanism is not limited and thus, no specifying is needed here. In both solution options of binding the sessions to use the same PDP context, the User Equipment (UE) controls the session multiplexing and therefore may modify the existing PDP context instead of activating the new one.

In other words, the Proxy Call State Control Function (P-CSCF) sends an indication to the User Equipment (UE) to group the media to use the same PDP context as earlier.

With message 16, the Push to talk over Cellular (PoC) application server sends "SIP 2xx" response. The Push to talk over Cellular (PoC) application server returns the port number of session, or the Push to talk over Cellular (PoC) application server may use an application layer indication (e.g. a multiplexing indicator in the data field header).

With message 17, the Serving Call State Control Function (S-CSCF) sends "SIP 2xx" to the Proxy Call State Control Function (P-CSCF).

With message 18, the Proxy Call State Control Function (P-CSCF) sends "SIP 2xx" to the User Equipment (UE). In the industry standard of PoC (release one), compliant PoC enabled User Equipment (UE) and the Push to talk over Cellular (PoC) application servers do not support the sending of the SIP 183message. In these cases, the port number of the session is sent in final response SIP 2xx (SIP 200 "OK" or SIP 202 "Accepted" like defined e.g. in industry standard of PoC release 1.0).

With messages 19-25 in FIG. 2 (and with messages 10-16 in FIG. 3), the Policy Decision Function (PDF) and Push to talk over Cellular (PoC) enabled User Equipment (UE) act towards the Gateway GPRS Support Node (GGSN) so that the Push to talk over Cellular (PoC) request is a modification to an already authorized PDP context (and to the ongoing SIP session on the control plane).

Figure 4:
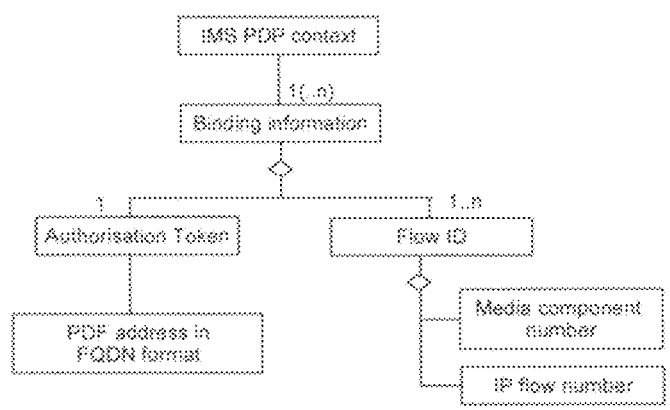
FIG. 4 shows how flow information is supplied by a User Equipment (UE).

This means that adding a new controlling SIP session is seen as adding a new media component in the user plane session. Still, there shall be separated SIP sessions for all group attachments and one-to-one Push to talk over Cellular (PoC) communications on the control plane level. It is to be noted that it is already possible to have several media components in one Authorization Token (see FIG. 4).

Specifically, with message 19 the (UE) shall add the new media component for the same PDP context by sending the "Modify PDP context" request to the Serving GPRS Support Node (SGSN). It is to be noted that this can be done, because the Quality of Service (QoS) is all the time the same for Push to talk over Cellular (PoC) services.

With message 20, the Serving GPRS Support Node (SGSN) sends the request to the Gateway GPRS Support Node (GGSN).

With message 21, the Gateway GPRS Support Node (GGSN) sends "COPS: REQ" to the Proxy Call State Control Function (P-CSCF) (Policy Decision Function (PDF)), which makes the authorization decision.

Figure 5:
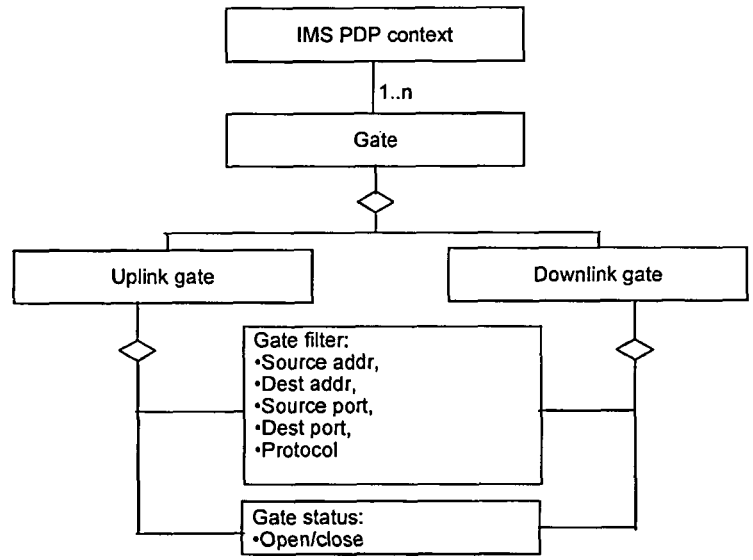
FIG. 5 shows the flow specific policy as supplied by the Policy Decision Function (PDF).

With message 22, the Proxy Call State Control Function (P-CSCF) (Policy Decision Function (PDF)) updates the packet classifier filter of the PDP context and sends the authorization decision to the Gateway GPRS Support Node (GGSN) in "COPS:DEC" decision message. As it is shown in FIG. 5, every gate has its own filters.

The Policy Decision Function (PDF) can send "COPS: DEC" decision message whenever originating or terminating point of the session updates the SDP with a new offer/answer, and unsolicited decision is needed (e.g. when the port changes or larger QoS parameters are received). This could happen e.g. in SIP 183, SIP UPDATE, SIP 200 OK, SIP ACK and SIP PRACK.

With message 23, the Gateway GPRS Support Node (GGSN) sends the "COPS: RPT" to the Proxy Call State Control Function (P-CSCF) (Policy Decision Function (PDF)).

With message 24, the Gateway GPRS Support Node (GGSN) sends the "Modify PDP context Accept" acknowledgment to the Serving GPRS Support Node (SGSN).

With message 25, the Serving GPRS Support Node (SGSN) sends it to the Push to talk over Cellular (PoC) enabled User Equipment (UE).

In contrast thereto, when the User Equipment (UE) is activating a new PDP context for a new SIP session, the messages 19-25 are as follows.

With message 19, the Push to talk over Cellular (PoC) User Equipment (UE) sends the "Activate PDP context" request to the Serving GPRS Support Node (SGSN), if the Proxy Call State Control Function (P-CSCF) (Policy Decision Function (PDF)) returns a new authorization Token.

With message 20, the Serving GPRS Support Node (SGSN) sends the request to the Gateway GPRS Support Node (GGSN).

With message 21, the Gateway GPRS Support Node (GGSN) identifies the Policy Decision Function (PDF) to interact with using a Policy Decision Function (PDF) identifier. The Policy Decision Function (PDF) identifier is part of the media authorization Token in the binding information, and is a fully qualified domain name. The Gateway GPRS Support Node (GGSN) sends the "COPS: REQ" to the Proxy Call State Control Function (P-CSCF) (Policy Decision Function (PDF)).

With message 22, the Proxy Call State Control Function (P-CSCF) (Policy Decision Function (PDF)) receives the binding information in it and makes the authorization decision and sends it in "COPS:DEC".

With message 23, the Gateway GPRS Support Node (GGSN) sends "COPS: RPT" to the Proxy Call State Control Function (P-CSCF) (Policy Decision Function (PDF)).

With message 24, the Gateway GPRS Support Node (GGSN) sends the "Activate PDP context Accept" acknowledgment to the Serving GPRS Support Node (SGSN).

With message 25, the Serving GPRS Support Node (SGSN) sends it to the Push to talk over Cellular (PoC) User Equipment (UE).

Finally, with message 26 the Push to talk over Cellular (PoC) User Equipment (UE) sends "SIP ACK" to the Proxy Call State Control Function (P-CSCF) in order to inform that the PDP context activation is succeeded, and with message 28, the Proxy Call State Control Function (P-CSCF) sends the "SIP ACK" to the Serving Call State Control Function (S-CSCF), which sends it to the Push to talk over Cellular (PoC) server.

The new requirements for the present embodiment are a new session multiplexing specific SIP session release, which is described later in connection with FIG. 9 (and FIG. 13). In addition, a new data area is needed. Further, there may be also the new type of media component for Push to talk over Cellular (PoC) applications to distinguish them among other media components at the Gateway GPRS Support Node (GGSN) level.

The advantages of the present embodiment are that the Go-interface (Common Open Policy Service (COPS) protocol) and packet core network elements are maintained fully 3GPP release 5 compliant. Further, the adding of the new media component requires media authorization. Using the authorization process confirms that the user cannot join-in to other Push to talk over Cellular (PoC) groups than those he/she is authorized to join-in. In addition, the session specific charging can be implemented to concern each media component in the Gateway GPRS Support Node (GGSN) (e.g. the flow id may be used as a charging indication).

Embodiment 2: Port Number Wildcard

The present embodiment utilizing a port number wildcard (as well as embodiment 3 utilizing filtering options) is not requiring media (re)-authorizing after the PDP context is once activated. Therefore these options are for more time critical 1-to-1-communications (personal Push to talk over Cellular (PoC) communications).

That is, adding the new media component according to the above embodiment 1 requires always the media authorization and Radio Access Bearer (RAB) assignment procedure, which might take too much time for Push to talk over Cellular (PoC) 1-to-1-communication set-up. Still, embodiment 1 can be used for Push to talk over Cellular (PoC) group (1-to-many) communications in which the user has always to request beforehand to join-in the group. This decision is up to the policy of the operator.

Figure 6:
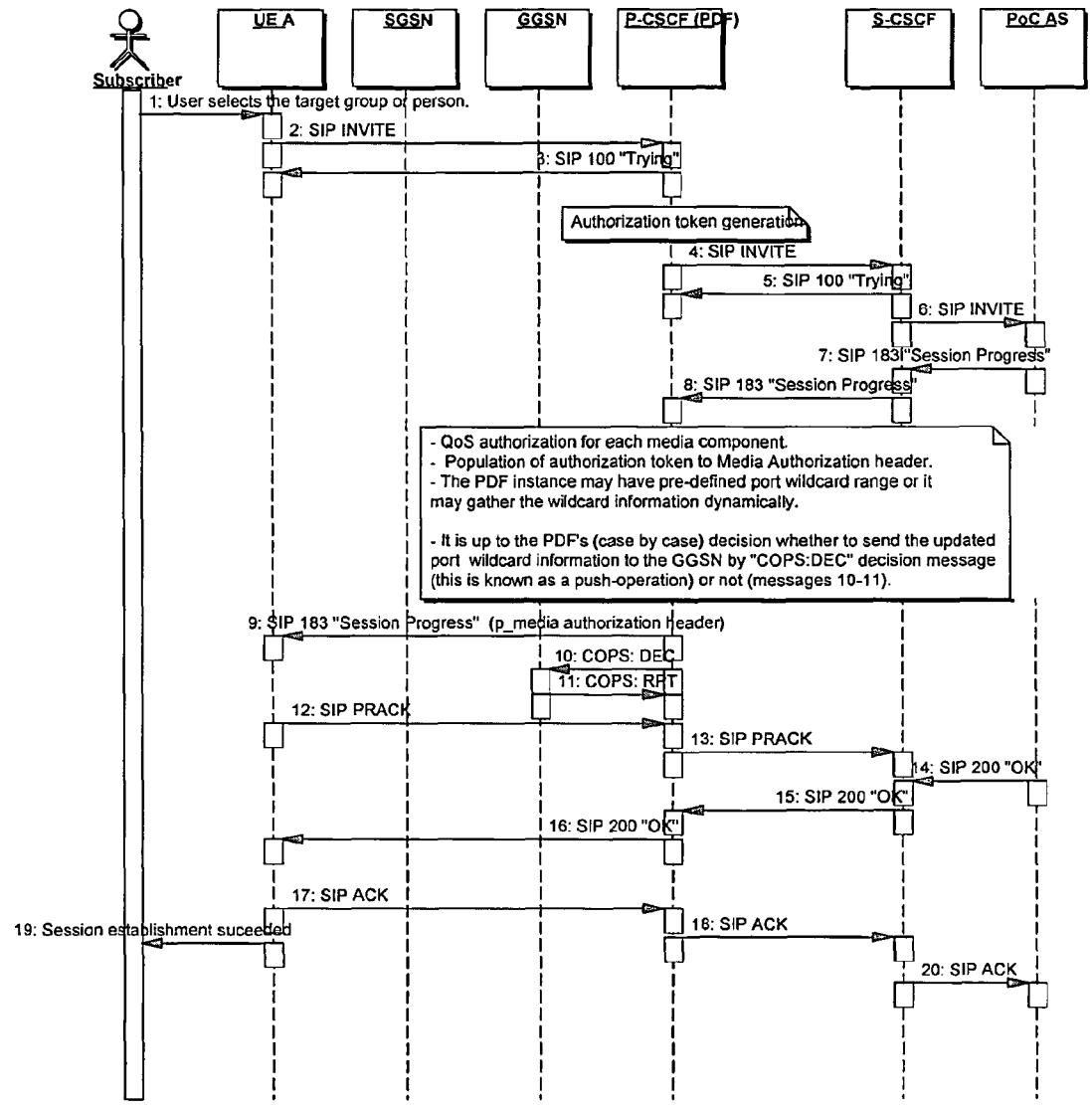
FIG. 6 shows a second embodiment of the invention where a wildcard port number is utilized.
Figure 7:
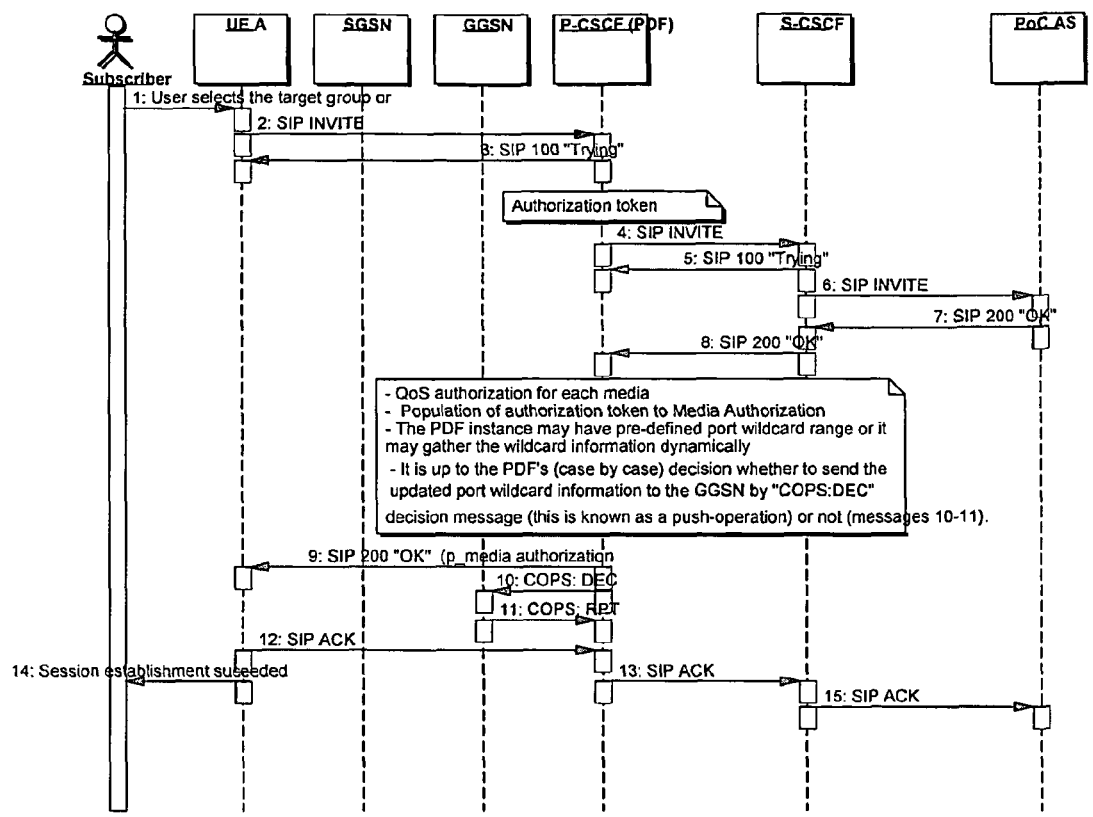
FIG. 7 shows a second embodiment of the invention where a wildcard port number is utilized in case the UE/network is not supporting precondition requirements (e.g. the industry standard of PoC release 1.0 compliant UEs).

The procedure according to the present embodiment of a port wildcard option is depicted in FIGS. 6 and 7.

Specifically, messages 1 and 2 are like in the above first embodiment.

With message 3, the Proxy Call State Control Function (P-CSCF) may automatically send "SIP 100" (Trying) to the User Equipment (UE).

The Policy Decision Function (PDF) shall know whether there are other ongoing Push to talk over Cellular (PoC) sessions originating from the same User Equipment (UE). Like in embodiment 1, the Policy Decision Function (PDF) increases the Push to talk over Cellular (PoC) session counter, for example.

With message 4, the Proxy Call State Control Function (P-CSCF) sends "SIP INVITE" to the Serving Call State Control Function (S-CSCF).

With message 9 (in FIG. 6), the Proxy Call State Control Function (P-CSCF) sends the media authorization header (with Authorization Token) to the Push to talk over Cellular (PoC) User Equipment (UE) in "SIP 183" (Session progress). In FIG. 7, with message 16, the Proxy Call State Control Function (P-CSCF) sends the media authorization header in final response SIP 2xx (SIP 200 "OK" or SIP 202 "Accepted"). The Authorization Token or the message body or payload may contain some kind of indication that the sessions shall be bind together. In other words, the Proxy Call State Control Function (P-CSCF) sends an indication to the User Equipment (UE) to group the media to use the same PDP context as earlier.

With message 14 (in FIG. 6), the Push to talk over Cellular (PoC) application server sends "SIP 2xx". The Push to talk over Cellular (PoC) application server shall send the exact port number of the session and it may also send the predefined wildcard port number range in the Session Description Protocol (SDP) payload of "2xx" (SIP 200 "OK" or SIP 202 "Accepted"). Sending the wildcard port number range is a new requirement for Push to talk over Cellular (PoC) application server. It is to be noted that the Push to talk over Cellular (PoC) application server may also use the upper layer multiplexing mechanism. With message 15, the Serving Call State Control Function (S-CSCF) sends "SIP 2xx" to the Proxy Call State Control Function (P-CSCF).

In the industry standard of PoC (release one), compliant PoC enabled User Equipment (UE) and the Push to talk over Cellular (PoC) application servers do not support sending SIP 183message (part of so-called pre-condition requirement). In these cases, the media authorization header is sent in final response SIP 2xx (SIP 200 "OK" or SIP 202 "Accepted") with message 9 in FIG. 7.

The Policy Decision Function (PDF) may receive the predefined wildcard port number range in the SIP 2xx message, or the PDF may use the predefined range the operator has configured by operator's local policy or PDF may derive the range according to user's exact port usage (group attachments).

If the new port number is already covered by earlier obtained wildcarding port number range, it does not require any media authorization. In case the new port number is not covered by the wildcarding, the Proxy Call State Control Function (P-CSCF) (Policy Decision Function (PDF)) shall send the new port wildcard information to the Gateway GPRS Support Node (GGSN) by sending "COPS:DEC" decision message as a push-operation.

With message 16, the Proxy Call State Control Function (P-CSCF) forwards "SIP 2xx" to the User Equipment (UE).

The User Equipment (UE) sends "SIP ACK" to the Proxy Call State Control Function (P-CSCF) in order to inform that the PDP context modification is succeeded. The Proxy Call State Control Function (P-CSCF) sends the "SIP ACK" to the Serving Call State Control Function (S-CSCF), which sends it to the Push to talk over Cellular (PoC) server. The User Equipment (UE) takes the new port in use by sending the RTP/RTCP message to the Serving GPRS Support Node (SGSN).

The new requirements for the present embodiment utilizing a wildcard option are that a Push to talk over Cellular (PoC) specific release is like in the first embodiment and also the new data-area is needed. Still further, sending the wildcard port number range would be also a new requirement for the Push to talk over Cellular (PoC) application server, while the Push to talk over Cellular (PoC) enabled User Equipment (UE) shall take the new port in use without media authorization.

The advantages of the present embodiment utilizing a wildcard option are that the port number wildcard option (and filtering option, see third embodiment) does not require a media (re)-authorizing after the PDP context is once activated. Therefore, the present option (as well as the one that follows with embodiment 3) is for more time-critical 1-to-1-communications (Personal Instant Push to talk over Cellular (PoC) communications). In addition, the port wildcard option according to the present embodiment (as well as the filtering option according to the third embodiment) may also by be used for pre-session (PoC-specific early session) establishment.

Embodiment 3: The Port Filtering Option

Alternatively to maintaining the security, the Push to talk over Cellular (PoC) server could send the port number received in the Session Description Protocol (SDP) as usual. It is to be noted that the target address of the Push to talk over Cellular (PoC) server of the user is the same all the time (all the traffic shall pass the user's home Push to talk over Cellular (PoC) server). Still, the target port number is changing according to the group attached to. This way, the User Equipment (UE) knows which port to send to in each Push to talk over Cellular (PoC) session. However, because the Common Open Policy Service (COPS) protocol over the Go-interface supports only one port number or port ranges [min, max], the port numbers cannot be used by the Gateway GPRS Support Node (GGSN) in the Packet Classifier filters, i.e. the Policy Decision Function (PDF) shall wildcard the port number in the Packet Classifiers sent to the Gateway GPRS Support Node (GGSN) (at least as soon as more than one Push to talk over Cellular (PoC) session is active).

However, the port filtering can be done in the Push to talk over Cellular (PoC) application server, since the server knows which port numbers have been sent to each User Equipment (UE) and can filter the incoming packets accordingly. The Gateway GPRS Support Node (GGSN) can still use the IP address of the Push to talk over Cellular (PoC) server for filtering as usual. This way, a complete filtering can be used in both directions. This procedure is depicted in FIG. 2 and FIG. 3.

Accordingly, the messages 1-7 are the same in the first embodiment. A pre-condition is that again that there is an already activated PDP context for Push to talk over Cellular (PoC).

Then, with message 8, the Proxy Call State Control Function (P-CSCF) (Policy Decision Function (PDF)) does not re-calculate the Quality of Service (QoS) parameters, since the sessions shall not transmit simultaneously and the Quality of Service (QoS) for Push to talk over Cellular (PoC) is always the same. The PDF can define some way to bind the sessions to the same PDP context, which however is a pure question of the implementation for the Policy Decision Function (PDF). The Proxy Call State Control Function (P-CSCF) sends the media authorization header to the Push to talk over Cellular (PoC) enabled User Equipment (UE) in "SIP 183" (Session progress) or in final response SIP 2xx (SIP 200 "OK" or SIP 202 "Accepted").

With a new binding mechanism, the Proxy Call State Control Function (P-CSCF) sends an indication to the User Equipment (UE) to group the media to the same Token (to use the same PDP context) as earlier. Since the User Equipment (UE) is a dedicated Push to talk over Cellular (PoC) enabled User Equipment (UE), this is not a problem at all.

With message 16 in FIG. 2 (and with message 7 in FIG. 2), the Push to talk over Cellular (PoC) application server sends "SIP 2xx" (with the port number of a Push to talk over Cellular (PoC) group or a personal communication).

With message 17, the Serving Call State Control Function (S-CSCF) sends "SIP 2xx" the to Proxy Call State Control Function (P-CSCF).

The Policy Decision Function (PDF) updates the packet classifier filter (to contain both values min and max for filtering) and sends it to the Gateway GPRS Support Node (GGSN) via the Go-interface in the decision message. It is to be noted that it is not possible to add several separate port numbers for filtering (current limitation of Common Open Policy Service (COPS) protocol).

There are at least three possibilities to filter the ports. The first and preferred one is, that the Policy Decision Function (PDF) defines that towards certain IP addresses (e.g. Push to talk over Cellular (PoC) server's media mixers) all the port numbers are available. After this, the detection shall be based on either IP address on the Gateway GPRS Support Node (GGSN). This possibility does not require a media re-authorization.

Another possibility is that the Policy Decision Function (PDF) sends the min and max value of ports to the Gateway GPRS Support Node (GGSN), and for each request it shall check if the received port number is between those. If not, the User Equipment (UE) shall request the media authorization in order to inform the new limit values. This must be effected, because the Common Open Policy Service (COPS) protocol does not allow to add several separate port numbers for filtering.

The third possibility is that the Proxy Call State Control Function (P-CSCF) could request the filtering with an address and port number combination, even if the address of the Push to talk over Cellular (PoC) server is all the time the same.

The latter two possibilities require a media re-authorization.

With message 18, the Proxy Call State Control Function (P-CSCF) sends "SIP 2xx" to the User Equipment (UE). The Proxy Call State Control Function (P-CSCF) (Policy Decision Function (PDF)) shall send the new port filtering information (if needed) to the Gateway GPRS Support Node (GGSN) by sending the "COPS:DEC" decision message as a push-operation.

The User Equipment (UE) sends "SIP ACK" to the Proxy Call State Control Function (P-CSCF) in order to inform that the PDP context modification is successful. The Proxy Call State Control Function (P-CSCF) sends "SIP ACK" to the Serving Call State Control Function (S-CSCF), which sends it to the Push to talk over Cellular (PoC) server. The User Equipment (UE) takes the new port in use by sending the RTP/RTCP message to the Serving GPRS Support Node (SGSN).

An advantage of the present embodiment is again that the Go-interface and the Gateway GPRS Support Node (GGSN) are maintained fully 3GPP release 5 compliant. In addition, the security risks are reduced when compared to the above port wildcard solution. Even if the media authorization is done just once, if the filtering is set to direct all the media from the User Equipment (UE) to the same end-point (e.g. to Push to talk over Cellular (PoC) server), this is an effective solution to eliminate the misuse.

According to the present embodiment, no changes to the functions of the Push to talk over Cellular (PoC) server are required.

Other details are already indicated above for which reason their repetition here is omitted.

Embodiment 4: User Equipment Controls Session Multiplexing

The present embodiment provides an enhancement to the Policy Decision Function (PDF) behavior and does not affect the Go-interface that will remain 3GPP release 5 compliant.

Accordingly, with the present embodiment, a further option to implement the multiplexing to the network and new proposals how to release multiplexed SIP sessions are described.

Specifically, the User Equipment (UE) makes its own decision to multiplex sessions to the same PDP context. The network may or may not send media grouping instructions to do so (see FIG. 2). In this case the Proxy Call State Control Function (P-CSCF) (Policy Decision Function (PDF)) do not send any media grouping instructions to the User Equipment (UE), it can freely group media to the PDP contexts. Since the User Equipment (UE) is a dedicated Push to talk over Cellular (PoC) enabled User Equipment (UE), this is not a problem at all.

In case the Proxy Call State Control Function (P-CSCF) does not send any media grouping instructions to the User Equipment (UE), it can freely group media to the PDP contexts. The Push to talk over Cellular (PoC) User Equipment (UE) may then group the media to use the same PDP context.

The pre-conditions are the Push to talk over Cellular (PoC) User Equipment (UE) and the network support session multiplexing and that the PDP context is already allocated for Push to talk over Cellular (PoC).

FIG. 2 shows how the User Equipment (UE) takes care of the multiplexing support.

There are two options. The first on is that (as defined earlier) with message 8 a new Authorization Token is generated for every session. To authorize the PDP context modification the Gateway GPRS Support Node (GGSN) shall send an authorization request to the Policy Decision Function (PDF) including the binding information received from the User Equipment (UE) in the following cases. The requested Quality of Service (QoS) exceeds the "Authorized Quality of Service (QoS)", and new binding information is received. The session may be User Equipment (UE) originating or terminating (application server (AS) originating). Both the User Equipment (UE) originating and terminating session request may contain some kind of service indication such as a service tag (e.g. Push to talk over Cellular (PoC) tag). Hence, the Policy Decision Function (PDF) and the User Equipment (UE) shall pick up the Push to talk over Cellular (PoC) sessions among other requests.

The User Equipment (UE) supports the multiplexing and passes the received Token in the PDP context modification (not PDP context activation as in normal SIP session requests). The target IP address is the same, just a new port number is added.

With message 21, the Gateway GPRS Support Node (GGSN) triggers the Common Open Policy Service (COPS) REQ to the Policy Decision Function (PDF) identified by the Token as usual. The Token is unique for each session, still the Token must point to the same Policy Decision Function (PDF) instance for all the sessions involved. This is no problem, since the session authorization carries both information: SESSION_ID and AUTH_ENT_ID.

The Policy Decision Function (PDF) needs to find the session (as usual) and needs to determine that it is one more Push to talk over Cellular (PoC) session carried in the same PDP Context.

The Policy Decision Function (PDF) needs to maintain a binding of multiple Push to talk over Cellular (PoC) sessions to the same PDP Context. Based on the knowledge that this is one more Push to talk over Cellular (PoC) session into the same PDP Context, the Policy Decision Function (PDF) gives the same authorized Quality of Service (QoS) (e.g. Max bandwidth) as if only one Push to talk over Cellular (PoC) session was carried, since the Push to talk over Cellular (PoC) enabled User Equipment (UE) is not doing real multiplexing of media flows. The Push to talk over Cellular (PoC) sessions are not using the PDP context simultaneously, they just use it in shifting one session at a time. Thus, the bandwidth (and the Quality of Service (QoS)) will be the same all the time.

The Policy Decision Function (PDF) updates the gating table with the new allowed IP classifiers.

With message 22, the Policy Decision Function (PDF) sends the Authorization Decision Go Policy Information Base (PIB) to the Gateway GPRS Support Node (GGSN) in the Common Open Policy Service (COPS) DEC message as usual (with perhaps extension for flow based charging if wanted).

With message 24, the Gateway GPRS Support Node (GGSN) accepts the PDP context modification. The binding information is successfully modified using the PDP context modification procedure, and the Gateway GPRS Support Node (GGSN) shall replace the old binding information with the new binding information.

The second option is (the same idea is used in the filtering option):

The Policy Decision Function (PDF) defines that towards certain IP addresses (e.g. Push to talk over Cellular (PoC) server's media mixers) all the port numbers are available. After this, the detection shall by base on either IP address on the Gateway GPRS Support Node (GGSN). This possibility does not require a media re-authorization.

As stated above, the network may or may not give media grouping instructions. The details of the former case are described below.

The User Equipment (UE) knows all its active (originating and terminating) sessions (and the binding information of them) and can make a difference between normal SIP sessions and special multiplexed sessions for Push to talk over Cellular (PoC) (or any other forthcoming new service).

However, it may be useful for the User Equipment (UE) to know if session multiplexing is supported in the network. The Push to talk over Cellular (PoC) enabled User Equipment (UE) may receive some kind of multiplexing indication from the network. The indication should be carried in a "SIP 183" message or other messages (sent by the Proxy Call State Control Function (P-CSCF) or the A-subscriber's Push to talk over Cellular (PoC) application server (AS)).

For this purpose, it is possible to define a Push to talk over Cellular (PoC) multiplexing tag (in SIP level or in the session part of the Session Description Protocol (SDP) payload) to give such an indication, e.g. the SIP "Proxy-Require:" and "Supported:" headers could be used with a new Token, like "Single Session Multiplex". If this information is not present, the User Equipment (UE) is free to decide whether to multiplex media of a different session in the same PDP context and what media to multiplex. If this information is present, the User Equipment (UE) shall not multiplex media of different sessions.

The "multiplex" instructions of the network are useful in some special occasions or implementing options. An already defined case is "optimizing the multiplexing procedure of the User Equipment (UE)".

In addition to, or instead of the above-mentioned indication, the network may indicate what media of different session can be multiplexed in the same PDP context. This information will be used by the Policy Decision Function (PDF) to authorize the bearer. If the User Equipment (UE) violates the network indication, the bearer will not be granted. In order to achieve this, it is possible to define a new "Session Description Protocol (SDP) session identification" session attribute to uniquely identify a given session of a given user. This new attribute would be for example:

sid-attribute "a=sid:" unique-identifier
unique-identifier=Token

The mapping of media streams to resource reservation flows could be extended to cover the grouping of media of different sessions. For example, if the grouping of different sessions is supported, the network can identify what media of what session need to be multiplexed by indicating "sid, mid" in the single reservation flow.

Below, an example is given.

An end user has one active SIP sessions with SDP1 and activates a new session with SDP2:

| SDP1 | SDP2 |
|---|---|
| v=0 | v=0 |
| o=....... | o=..... |
| t=0 0 | t=0 0 |
| c=IN IPv6 ......... | c=IN IPv6 ........... |
| a=sid:1 | a=sid:2 |
| a=group:SRF 1 2 | a=group:SRF 1,1 1,2 2,1 |
| a=group:SRF 3 | m=audio....... |
| m=audio ....... | a=mid:1 |
| a=mid:1 | |
| m=video ....... | |
| a=mid:2 | |
| m=x-application ..... | |
| a=mid:3 | |

The "a=group" line in the Session Description Protocol (SDP) of the second SIP session (SDP2) indicates that session 1, media 1-session 1, media 2 and session 2, media 1 shall be carried in the same PDP Context.

As a particular modification to the present embodiment, the combination of the wildcard option according to the above-described second embodiment with the present embodiment is described hereinafter.

An enhancement to the present embodiment is that the network (Push to talk over Cellular (PoC) application server (AS) and Policy Decision Function (PDF)) may support the wildcarding option according to the above-described second embodiment. In this case, the Policy Decision Function (PDF) shall inform by a "SIP 183" message or in final response SIP 2xx (SIP 200 "OK" or SIP 202 "Accepted") about the wildcarding support and the User Equipment (UE) shall not send even any PDP context modification for session request (see FIG. 11).

Figure 11:
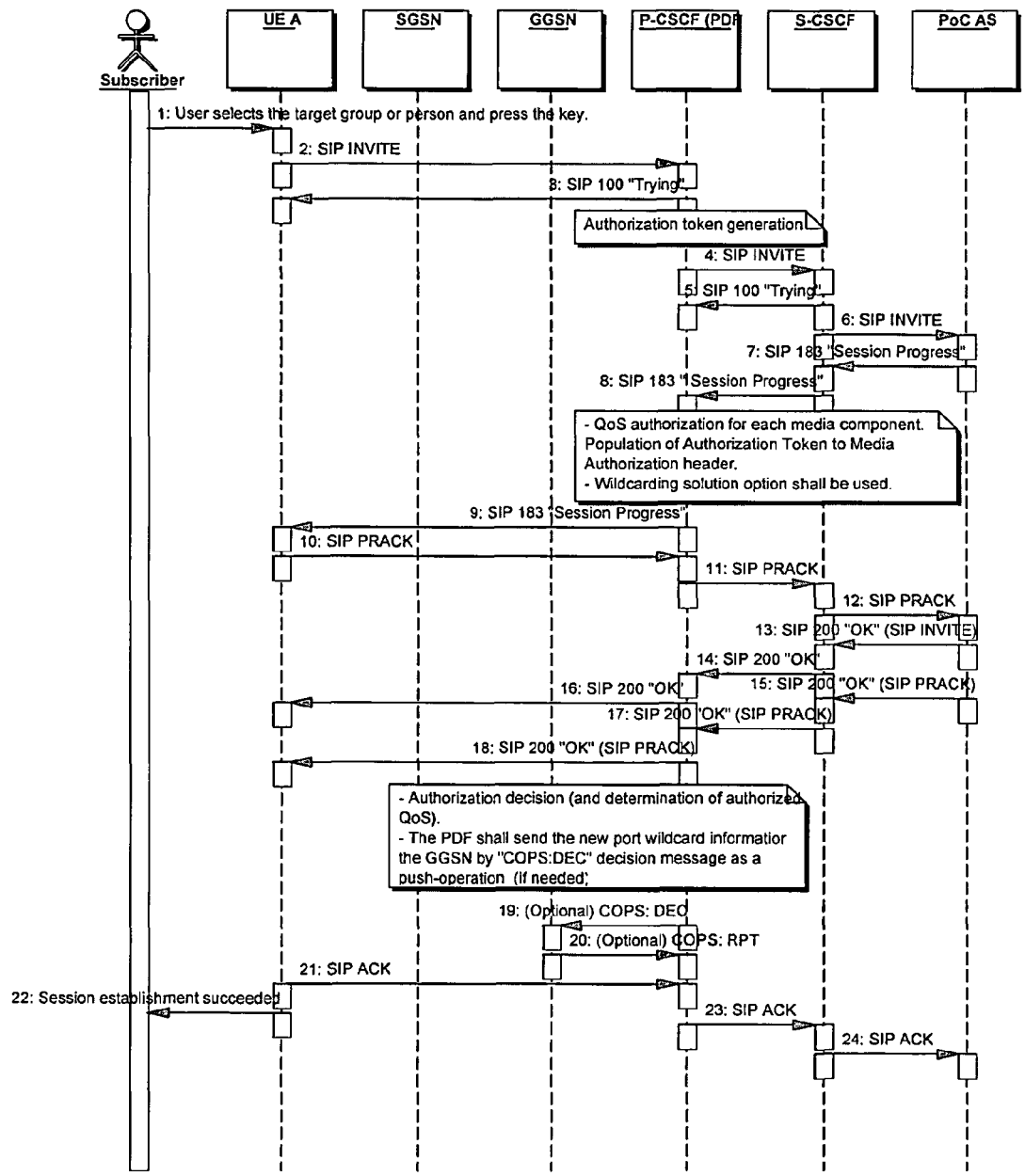
FIG. 11 shows a combination of the second embodiment with the fourth embodiment.
Figure 12:
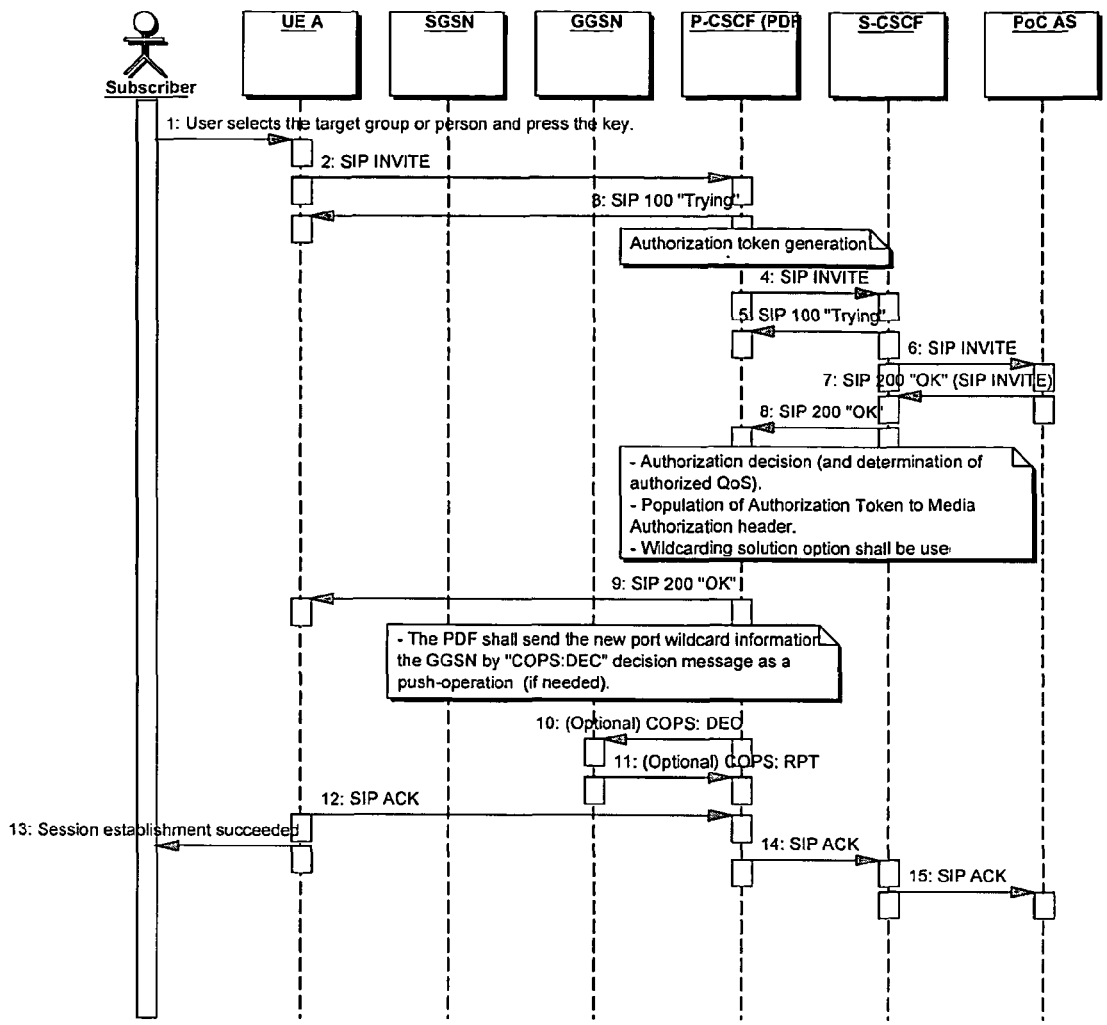
FIG. 12 shows a combination of the second embodiment with the fourth embodiment in case the UE/network is not supporting precondition requirements (e.g. the industry standard of PoC release 1.0 compliant UEs).

FIG. 11 (and FIG. 12) describes the combination of the wildcard option according to the second embodiment with the present embodiment. In detail, it is shown the situation of the second session request when the PDP context is already activated.

The new requirement for the present embodiment is a new session multiplexing specific SIP session release, which is described later in connection with FIG. 9 (and FIG. 13).

Described above is the situation where the User Equipment (UE) cannot support the session multiplexing or the Packet Core is unable to provide an authorized context for the requested session.

If the User Equipment (UE) does not support the session multiplexing, it shall create a new PDP context for each session request. It works until the User Equipment's (UE) capability (of supporting PDP contexts) will be exceeded, or the packet core network denies to allow any new PDP context for User Equipment (UE).

If the Policy Decision Function (PDF) shall not support the session multiplexing, it shall instruct the User Equipment (UE) to create always a new PDP context. User Equipment (UE) shall obey the received instructions of media grouping.

The enhancements of the present embodiment are that the new Authorization Token is generated for each session. The control of the session multiplexing function is moved to the User Equipment (UE). This makes the implementation of the Policy Decision Function (PDF) easier. Since the Authorization Token shall be unique for each session (as stated in the 3GPP specifications), currently there is no possibility to use the same Authorization Token for each user session to be multiplexed. Still, it could contain the same identifier for multiple sessions. Moreover, the present embodiment provides simple operation for the User Equipment (UE), the Policy Decision Function (PDF) and the Application Server (AS), and it conforms to Release 5 specifications and provides a viable alternative for session multiplexing.

Common Aspects

Figure 10:
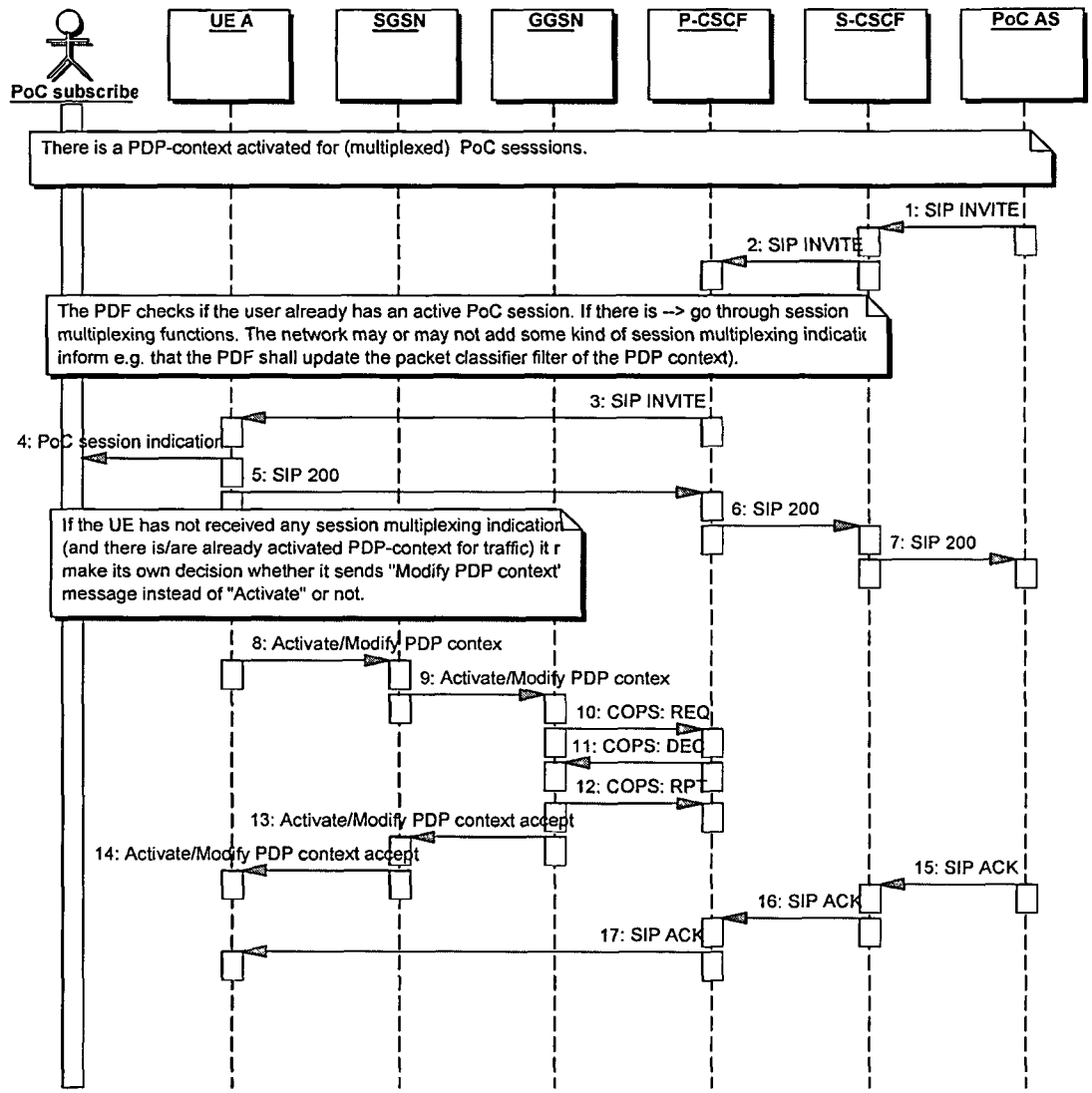
FIG. 10 shows a User Equipment (UE) terminating Push to talk over Cellular (PoC) session according to an embodiment of the invention.

The PDP context re-usage applies also to User Equipment (UE) terminating Push to talk over Cellular (PoC) sessions as depicted in FIG. 10. The Push to talk over Cellular (PoC) application server (AS) originating session can be the first Push to talk over Cellular (PoC) session of the user or there can be other ongoing Push to talk over Cellular (PoC) sessions for user.

In detail, with message 1 the Push to talk over Cellular (PoC) application server sends a Push to talk over Cellular (PoC) session request. The Push to talk over Cellular (PoC) server sends "SIP INVITE" (with the port number) to the Serving Call State Control Function (S-CSCF). It is to be noted that, because the user has registered into Push to talk over Cellular (PoC) services, the Push to talk over Cellular (PoC) application server knows the correct Serving Call State Control Function (S-CSCF) and the (S-CSCF) can directly route the request to the Proxy Call State Control Function (P-CSCF).

With message 2, the Serving Call State Control Function (S-CSCF) sends "SIP INVITE" to the Proxy Call State Control Function (P-CSCF).

The Proxy Call State Control Function (P-CSCF) (Policy Decision Function (PDF)) shall know if the user has other ongoing Push to talk over Cellular (PoC) sessions originating from the same User Equipment (UE) or terminating to the User Equipment (UE). The embodiments 1 and 2 require the following additional requirements to handle the User Equipment (UE) terminating sessions. At first, the same (Policy Decision Function (PDF) instant is to be used for all of the Push to talk over Cellular (PoC) sessions of the user (also for terminating ones). This is guaranteed, because the Authorization Token contains a Policy Decision Function (PDF) identifier. Next, the Proxy Call State Control Function (P-CSCF) (Policy Decision Function (PDF)) and the Push to talk over Cellular (PoC) User Equipment (UE) shall know if there are currently other ongoing Push to talk over Cellular (PoC) sessions (from or to the same User Equipment (UE)) and if there is/are one or several PDP context activated and carrying SIP session Further, whenever the Proxy Call State Control Function (P-CSCF) (Policy Decision Function (PDF)) receives the terminating Push to talk over Cellular (PoC) session establishment request it shall compare its port information to earlier received ones, and makes the decision, whether the media (re-) authorization is needed. If there are other ongoing sessions, the Policy Decision Function (PDF) shall select the PDP context re-usage handling mechanism according to the local policy of the operator. The mechanisms are already defined earlier. It is to be noted that all the proposed mechanisms shall be available for both mobile originating (MO) and mobile terminating (MT) cases. Finally, the Policy Decision Function (PDF) also increase its new "session counter" by one, whenever it receives the new Push to talk over Cellular (PoC) session request.

With message 3, the Proxy Call State Control Function (P-CSCF) sends the "SIP INVITE" to the User Equipment (UE).

The User Equipment (UE) may indicate the user about the new session request, this is shown as a message 4.

With message 5, the User Equipment (UE) sends the "SIP 200 "OK"" to the Proxy Call State Control Function (P-CSCF).

With message 6, the Proxy Call State Control Function (P-CSCF) sends the "SIP 200 " to the Serving Call State Control Function (S-CSCF).

With message 7, the Serving Call State Control Function (S-CSCF) sends the "SIP 200 " to the Push to talk over Cellular (PoC) server.

A pre-condition for all of these embodiments is that a PDP context is already established.

With message 8, the Push to talk over Cellular (PoC) enabled User Equipment (UE) sends the "Modify PDP context" request to the Serving GPRS Support Node (SGSN) (instead of activating the new PDP context for a new session).

With message 9, the Serving GPRS Support Node (SGSN) sends the request to the Gateway GPRS Support Node (GGSN).

The Gateway GPRS Support Node (GGSN) identifies the Policy Decision Function (PDF) to interact with using a Policy Decision Function (PDF) identifier. The Policy Decision Function (PDF) identifier is part of the media Authorization Token in the binding information, and is a fully qualified domain name.

With message 10, the Gateway GPRS Support Node (GGSN) sends the "COPS: REQ" to the Proxy Call State Control Function (P-CSCF) (Policy Decision Function (PDF)).

With message 11, the Proxy Call State Control Function (P-CSCF) (Policy Decision Function (PDF)) receives the binding information in it and makes the authorization decision and sends it in "COPS:DEC".

With message 12, the Gateway GPRS Support Node (GGSN) sends "COPS: RPT" to the Proxy Call State Control Function (P-CSCF) (Policy Decision Function (PDF)).

With message 13, the Gateway GPRS Support Node (GGSN) sends the "Modify PDP context Accept" acknowledgment to the Serving GPRS Support Node (SGSN).

With message 14, the Serving GPRS Support Node (SGSN) sends it to the Push to talk over Cellular (PoC) enabled User Equipment (UE).

With message 15, the Push to talk over Cellular (PoC) application server sends the "SIP ACK" to the Serving Call State Control Function (S-CSCF).

With message 16, the Serving Call State Control Function (S-CSCF) sends the "SIP ACK" to the Proxy Call State Control Function (P-CSCF).

With message 17, the Proxy Call State Control Function (P-CSCF) sends the "SIP ACK" to the User Equipment (UE). The Push to talk over Cellular (PoC) session is established between the User Equipment (UE) and the Push to talk over Cellular (PoC) server.

Figure 8:
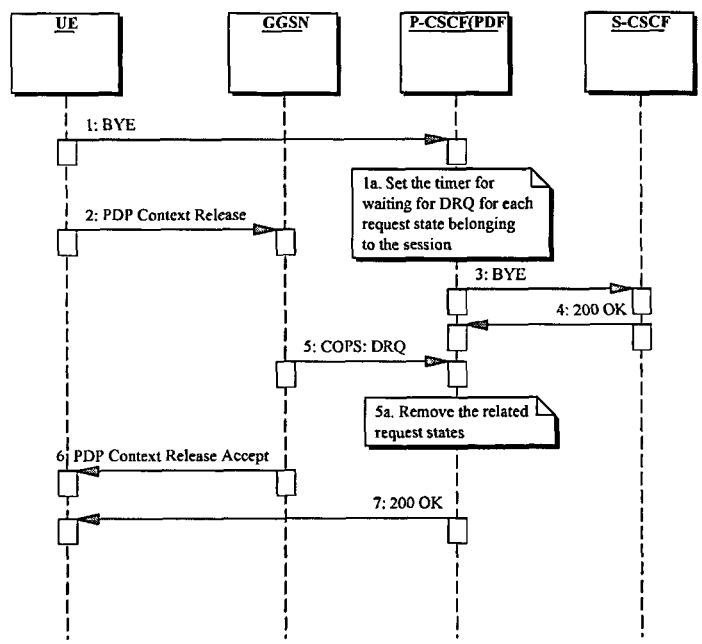
FIG. 8 shows the normal session release as known in the art.
Figure 9:
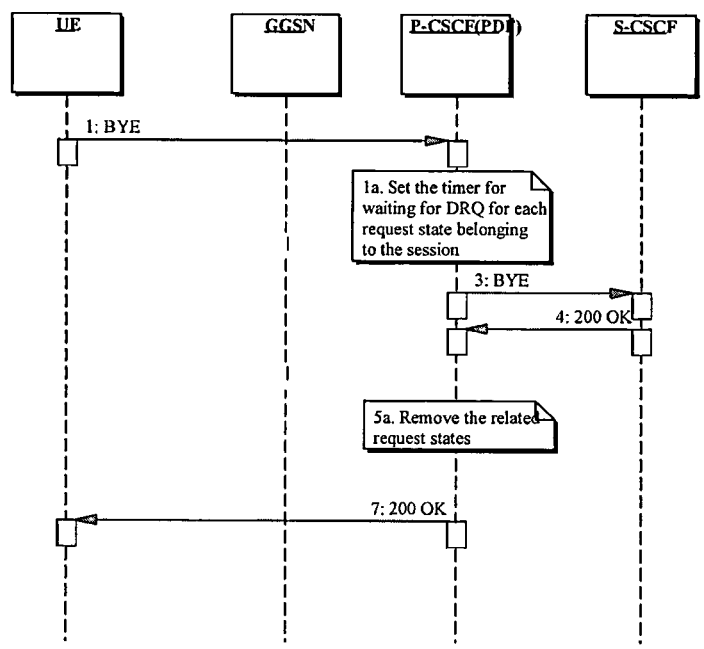
FIG. 9 shows a new Push to talk over Cellular (PoC) related session release according to an embodiment of the invention (option 1).
Figure 13:
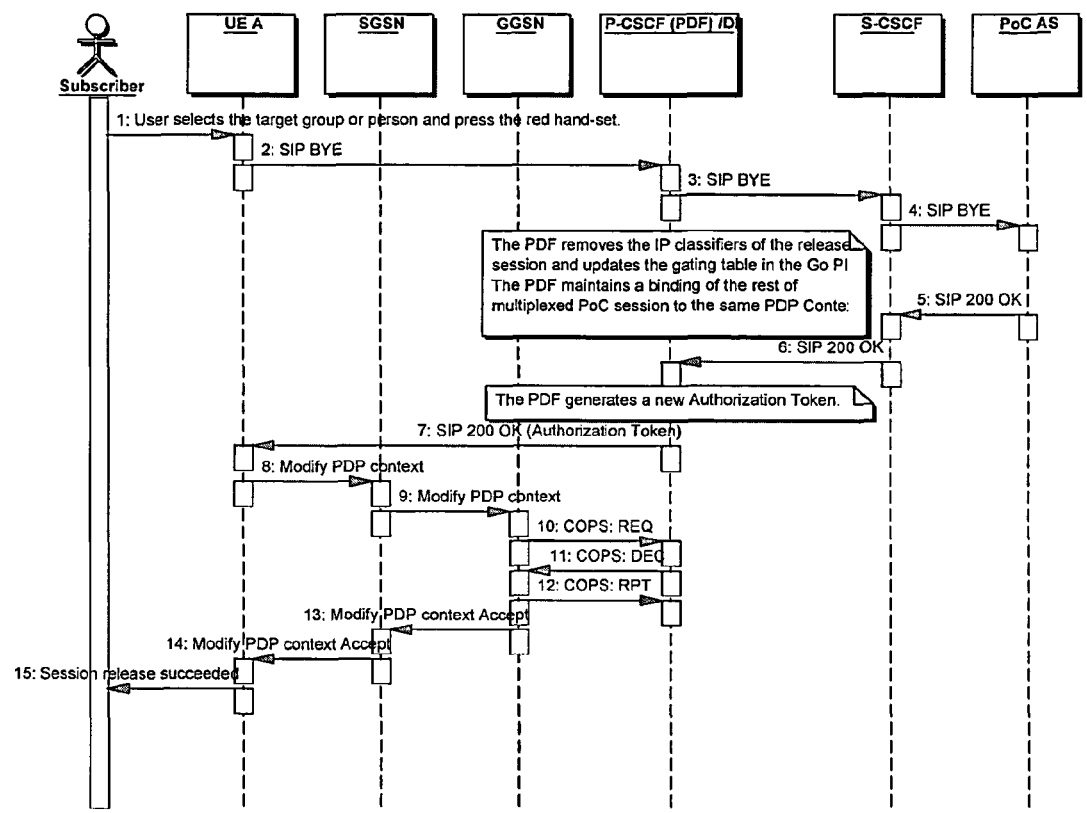
FIG. 13 shows the Push to talk over Cellular (PoC) session release by the Policy Decision Function (PDF) according to an embodiment of the invention (option 2).

Referring now to FIGS. 8, 9 and 13, the Push to talk over Cellular (PoC) session release procedure for the above explained embodiments are described below.

The new session multiplexing implementation requires the special mechanisms also for Push to talk over Cellular (PoC) session release. For the purpose of comparison, the normal session release is depicted in FIG. 8 while the new Push to talk over Cellular (PoC) related session release procedure is depicted in FIG. 9 and FIG. 13.

FIG. 9 shows the new Push to talk over Cellular (PoC) related session release (when there are one or several ongoing Push to talk over Cellular (PoC) sessions left). The session release is seen as a removal of a media component from the session on user plane level.

When just one of the Push to talk over Cellular (PoC) related SIP sessions shall be released, the User Equipment (UE) sends "SIP BYE" to the Proxy Call State Control Function (P-CSCF) (message 1) without sending the PDP context release message to the Serving GPRS Support Node (SGSN).

The Proxy Call State Control Function (P-CSCF) decreases the session counter by one. If there are other Push to talk over Cellular (PoC) sessions (originating from or terminating to the same User Equipment (UE)) left, the Policy Decision Function (PDF) does not revoke the authorization.

With message 2, the Proxy Call State Control Function (P-CSCF) sends the "SIP BYE" to the Serving Call State Control Function (S-CSCF). The Push to talk over Cellular (PoC) server replies with "SIP 200 OK".

The Push to talk over Cellular (PoC) enabled User Equipment (UE) also knows whether the release concerns just one of the ongoing Push to talk over Cellular (PoC) sessions or the last of the Push to talk over Cellular (PoC) related SIP sessions. The User Equipment (UE) does not send the PDP context release before the Push to talk over Cellular (PoC) related session of the last User Equipment (UE) is concerned. When the release concerns the last Push to talk over Cellular (PoC) session, the Push to talk over Cellular (PoC) enabled User Equipment (UE) shall act like a normal IP Multimedia Subsystem (IMS) terminal acts in a normal session release case (depicted in FIG. 8). Since the User Equipment (UE) is a dedicated Push to talk over Cellular (PoC) enabled terminal, this new Push to talk over Cellular (PoC) specific requirement is not a problem at all.

The authorization information is deleted when the last Push to talk over Cellular (PoC) related session is released.

Referring now to FIG. 10, the handling of User Equipment (UE) terminated Push to talk over Cellular (PoC) sessions according to the embodiments 1 and 2 is described.

FIGS. 9 and 13 show the case where the Policy Decision Function (PDF) handles the Push to talk over Cellular (PoC) session releasing.

The "SIP BYE" is received by the Proxy Call State Control Function (P-CSCF) upon Push to talk over Cellular (PoC) session release and the Policy Decision Function (PDF) is informed of the event.

The Policy Decision Function (PDF) looks up for the PDP context that carries the given Push to talk over Cellular (PoC) session (i.e. the PDP context handler) and updates the gating table in the Go Policy Information Base (PIB). The Policy Decision Function (PDF) may then send an unsolicited Common Open Policy Service (COPS) DEC message with the new gating table to the Gateway GPRS Support Node (GGSN), and the Gateway GPRS Support Node (GGSN) installs the gates as instructed by the Policy Decision Function (PDF).

The Proxy Call State Control Function (P-CSCF) sends the "SIP BYE" to the Serving Call State Control Function (S-CSCF). The Push to talk over Cellular (PoC) server replies with "SIP 200 OK".

In case the UE would continue to send/receive packets for the PoC session that was released, this operation ensures that all these packets are dropped in the GGSN.

Alternatively, by referring again to FIG. 13, a new Authentication Token can be generated for the "SIP BYE". Specifically, when the "SIP BYE" is received by the Proxy Call State Control Function (P-CSCF) upon the Push to talk over Cellular (PoC) session release and the Policy Decision Function (PDF) is informed of the event.

The Policy Decision Function (PDF) may generate a new Authentication Token that is sent to the User Equipment (UE) in SIP signaling ("SIP BYE" for the terminating party, "SIP 200 OK" of the "SIP BYE" to the originating party) and updates the gating table in the Go Policy Information Base (PIB) by removing the IP Classifiers of the Push to talk over Cellular (PoC) session being released.

Upon reception of the new Authentication Token, the User Equipment (UE) initiates a PDP Context Modification procedure to the Gateway GPRS Support Node (GGSN) including the new received Authentication Token.

FIG. 13 shows an enhanced Push to talk over Cellular (PoC) related session release (when there are one or several ongoing Push to talk over Cellular (PoC) sessions left).

With message 2 (FIG. 13), the "SIP BYE" is received by the Proxy Call State Control Function (P-CSCF) upon Push to talk over Cellular (PoC) session release and the Policy Decision Function (PDF) is informed of the event.

The Policy Decision Function (PDF) looks up for the PDP context that carries the given Push to talk over Cellular (PoC) session (i.e. the PDP context handler) and updates the gating table in the Go Policy Information Base (PIB). The Policy Decision Function (PDF) then sends an unsolicited Common Open Policy Service (COPS) DEC message (message 10) with the new gating table to the Gateway GPRS Support Node (GGSN), and the Gateway GPRS Support Node (GGSN) installs the gates as instructed by the Policy Decision Function (PDF).

In case the User Equipment (UE) would continue to send/receive packets for the Push to talk over Cellular (PoC) session that was released, this operation ensures that all these packets are dropped in the Gateway GPRS Support Node (GGSN).

Alternatively, a new Authentication Token can be generated for the "SIP BYE". Specifically, the "SIP BYE" is received by the Proxy Call State Control Function (P-CSCF) upon the Push to talk over Cellular (PoC) session release and the Policy Decision Function (PDF) is informed of the event.

The Policy Decision Function (PDF) generates a new Authentication Token that is sent to the User Equipment (UE) in SIP signaling ("SIP BYE" for the terminating party, "SIP 200 OK" response to the received "SIP BYE" to the originating party) and updates the gating table in the Go Policy Information Base (PIB) by removing the IP Classifiers of the Push to talk over Cellular (PoC) session being released. Upon reception of the new Authentication Token, the User Equipment (UE) initiates a PDP Context Modification procedure to the Gateway GPRS Support Node (GGSN) including the new received Authentication Token (with messages 8, FIG. 13).

With message 10, the Gateway GPRS Support Node (GGSN) sends the corresponding "COPS REQ" to the Policy Decision Function (PDF), which uses the new Authentication Token to retrieve the updated Go Policy Information Base (PIB).

With message 11, the Policy Decision Function (PDF) sends the updated Go Policy Information Base (PIB) in a Common Open Policy Service (COPS) DEC message to the Gateway GPRS Support Node (GGSN), and the Gateway GPRS Support Node (GGSN) installs the gates as instructed by the Policy Decision Function (PDF).

In case the User Equipment (UE) would continue to send/receive packets for the Push to talk over Cellular (PoC) session that was released, this operation ensures that all these packets are dropped in the Gateway GPRS Support Node (GGSN).

According to embodiment 4, (where the User Equipment (UE) controls session multiplexing) the User Equipment (UE) shall know all its active (originating and terminating) sessions and binding information of them. When the session multiplexing mechanism is supported, the User Equipment (UE) may initiate a PDP Context Modification procedure to the Gateway GPRS Support Node (GGSN) including the sets of binding information of those sessions remaining in the PDP context.

The Gateway GPRS Support Node (GGSN) sends the corresponding "COPS REQ" to the Policy Decision Function (PDF), which uses the new Authentication Token to retrieve the updated Go Policy Information Base (PIB). The Policy Decision Function (PDF) sends the updated Go Policy Information Base (PIB) in a Common Open Policy Service (COPS) DEC message to the Gateway GPRS Support Node (GGSN), and the Gateway GPRS Support Node (GGSN) installs the gates as instructed by the Policy Decision Function (PDF).

Modification

As another option, the operator can restrict the usage of the Go-interface for Push to talk over Cellular (PoC)-sessions. The access to the IP Multimedia Subsystem (IMS) can happen through a network with and without a service-based local policy. It is operator choice whether both or only one of these alternatives for accessing the IP Multimedia Subsystem (IMS) is offered. This would have the advantage that the PDP context reservation, usage and release may use the some kind of PDP context re-use mechanism without media authorization (similar as in earlier packet core releases).

Furthermore, an embodiment of the invention provides a great benefit for the Push to talk over Cellular (PoC) concept. In Push to talk over Cellular (PoC), the communication set-up time speeds up by the so-called PoC specific early session (earlier called as a pre-INVITE) solution. The early session/ pre-INVITE means that there is an active "always-on" SIP session between a User Equipment (UE) and an application server (AS) in order to provide a fast Push to talk over Cellular (PoC) communication set-up. The session multiplexing solution needs to show that the join-in to the new Push to talk over Cellular (PoC) group does not require a new PDP context activation.

One of the goals of Push to talk over Cellular (PoC) is to bring the push-to-talk facility into conventional cellular phones. An embodiment of the invention offers User Equipment (UE) manufacturers an opportunity to implement the push-to-talk facility across mobile phone categories, thus offering end-users more freedom to choose products that best meet their communication needs.

All of the above-presented embodiments comprise their own purposes. They can be used separately or all for different services. These mechanisms are advantageously applicable for Push to talk over Cellular (PoC) services, but they can be applied also to other IMS services.

The new media component adding may be used for Push to talk over Cellular (PoC) group attachments (i.e. join-in the group), which are not so time critical. The port wildcard and filtering mechanisms may be used for Push to talk over Cellular (PoC) personal (1-to-1) communication, which requires the immediately user plane set-up. The operator can define the local policy of the network and determine which way the Policy Decision Function (PDF) orders to use the PDP context or which of these mechanisms should be used. It is to be noted that if the Proxy Call State Control Function (P-CSCF) sends no indication of grouping the media, the User Equipment (UE) may freely group media to PDP context(s).

Session Multiplexing Indications

For the sake of simplicity of the above description, any detailed description about session multiplexing support is omitted, but presented with the description of the present preferred embodiment any alternatives of which can be combined with any of the above preferred embodiments of the invention.

Specifically, the present preferred embodiment serves to meet the following issues.

When separate sessions are multiplexed on the same PDP context, the user equipment UE shall be aware of whether the network supports the required multiplexing capability. If the user equipment UE tries to multiplex sessions in a network that does not support the multiplexing, the network rejects the PDP context modification made by the user equipment UE.

The known media grouping mechanism, i.e. the capability of the network to indicate to the user equipment UE that certain media flows of a given session can be multiplexed on the same PDP context and certain media flows of the given session must not be multiplexed on the same PDP context, cannot indicate to the user equipment UE whether the network supports inter-session multiplexing.

Further, it would be useful if the network could indicate which sessions are allowed to be multiplexed on the same PDP context and which not, e.g. PoC sessions are allowed to be multiplexed with each other, while other sessions are not allowed to be multiplexed with PoC sessions.

According to an embodiment of the invention, two alternatives of session multiplexing indications are proposed:

The first indication is based on release 6 (Rel-6) of the 3GPP. Namely, the network that supports (i.e. may allow or disallow) multiplexing of IP flows of separate sessions on the same PDP context indicates this capability to the user equipment UE during the session establishment to prevent a rejection of the later PDP context modification.

This first indication (e.g. a 'Session multiplexing allowed' flag) is needed, because the user equipment UE is not aware of the release and/or capabilities of the network originating the signalling, and a Rel-6 user equipment UE supporting multiplexing between sessions could interpret the lack of grouping indication from the network as a permission for multiplexing media components from session to the same PDP context.

If an inter-session multiplexing capable user equipment UE receives an indication of the relevant capabilities of the network (i.e. a 'Session multiplexing allowed' flag is present in the signalling), then the user equipment UE determines that the network allows session multiplexing for IP/media flows from different sessions and supports and allows inter-session multiplexing. This way the backward compatibility is maintained. This is depicted as case 4 in FIG. 14.

The second indication is that the network indicates to the user equipment UE which session can be multiplexed, using a session related grouping identifier "Session Grouping ID". IP/media flows of sessions having the same "Session Grouping ID" can be multiplexed on the same PDP context, while IP/media flows of sessions having different "Session Grouping Identifiers" cannot be multiplexed on the same PDP context.

If an inter-session multiplexing capable user equipment UE receives an indication of the relevant capabilities of the network, i.e. a "Session Grouping ID" (and a 'Session multiplexing allowed' flag if separate indications are mandated) is present in the signalling, then the user equipment UE determines that the network allows session multiplexing for IP/media flows from different sessions that have the same "Session Grouping ID", but not from sessions that have a different "Session Grouping ID". In this manner, the backward compatibility is maintained (see case 5 in FIG. 14)

If an inter-session multiplexing capable user equipment UE does not receive any indication of the relevant capabilities of the network (i.e. neither a grouping indication nor a 'Session multiplexing allowed' flag are present in the signalling), then the user equipment UE determines that the network allows session multiplexing for IP/media flows from the same session, but does not support or allow inter-session multiplexing. In this manner, the backward compatibility is maintained (see case 3 in FIG. 14)

A user equipment UE not supporting the inter-session multiplexing ignores the capability indications by the network. In this manner, the backward compatibility is maintained.

It is to be noted that the first indication ("Session multiplexing allowed" flag) can be included in the second indication ("Session Grouping ID") if both are supported in the network, i.e. a separate flag is not necessarily required if the "Session Grouping ID" is supported.

Figure 14:
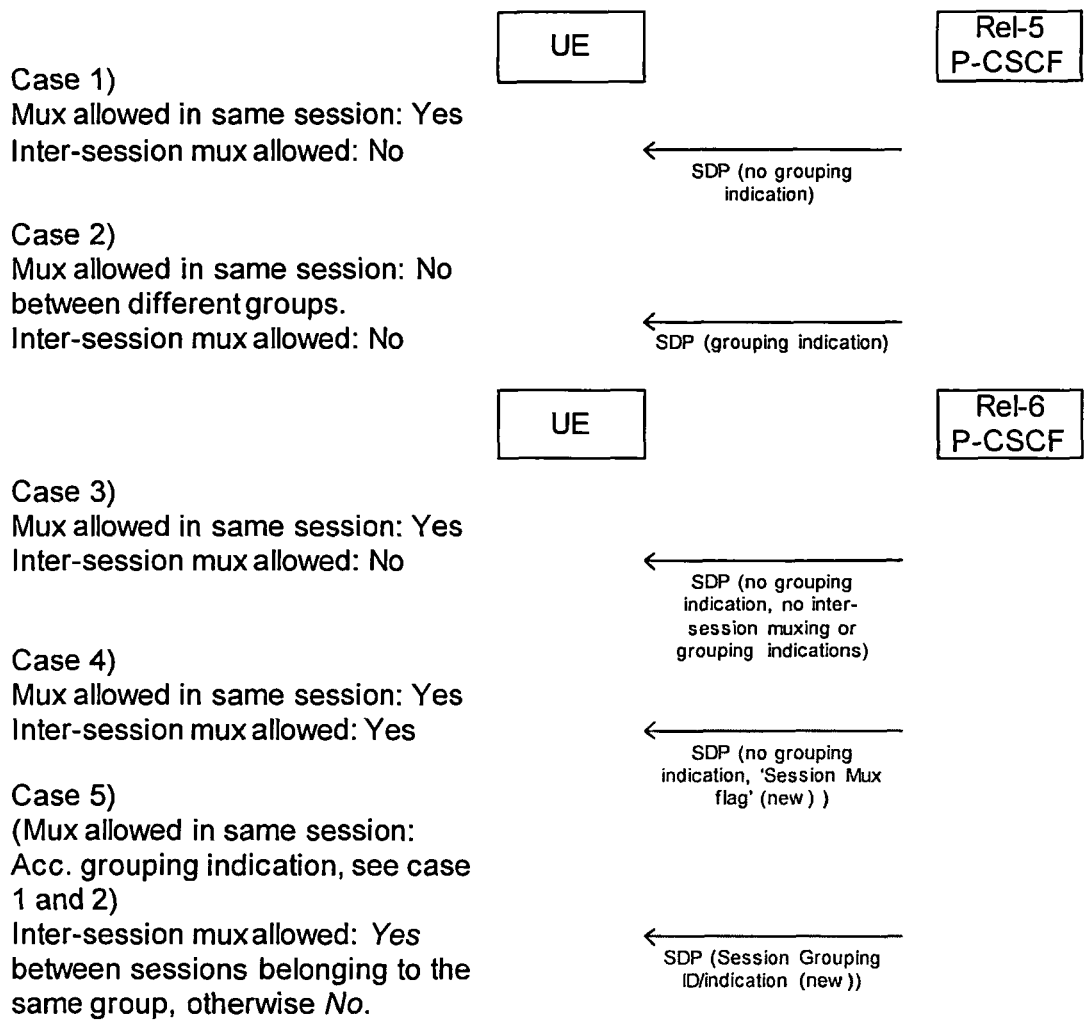
FIG. 14 shows an overview of media grouping use cases according to an embodiment of the invention.

FIG. 14 shows media grouping use cases of the allowance of multiplexing (mux) according to 3GPP release 5 and according to 3GPP release 6.

In the following, implementation examples for the above described indication alternatives are provided.

The indication for supporting inter-session multiplexing and the indication which sessions are allowed to be multiplexed with each other can be implemented in several backward compatible ways which avoid to confuse user equipment UE that do not support the inter-session multiplexing. There are three different principles:

The Application Function (P-CSCF in IMS) sends a relevant session related parameter (or parameters) in the AF session signalling (SIP/SDP in IMS) in a similar way as the "media grouping" is indicated for a given session. There are several ways to implement such a parameter (or parameters), for example:

Firstly, the current Single Reservation Flow (SRF) parameter with Media Flow Identifiers could be used with dedicated value ranges indicating separate "session groupings". That is, the current flow identifier is divided in two parts. One part is used as the currently used flow identifier. The other part is used for identifying the "session grouping". In other words, the Media Flow Identifier carries a value that is actually a concatenation of the values, one to indicate a session group, the other to indicate the flow identifier.

Backward compatibility is guaranteed, because the new parameters are carried inside an already existing parameter.

In practice, the uniqueness of the parameter values compared to a current Media Flow Only value (of networks supporting only intra-session multiplexing) can be achieved by making the parameter field long enough, e.g. by reserving four octets for both parameters.

Secondly, a new SRF like mechanism/parameters could be defined for the inter-session multiplexing.

The next principle is that the PDF sends a relevant parameter (or parameters) with the Authorization Token in the AF session signalling (SIP/SDP in IMS). Again, there are several ways for implementation, for example:

Firstly, a new subtype is defined for the session identifier parameter (reference is made to IETF RFC 3520). Currently, there is only a subtype ("0") that indicates a unique ID for the session. The new subtype indicates a group, the member sessions of which are allowed to be multiplexed on the same bearer (i.e. PDP context in the PLMN). If given sessions have different values in their group parameters, the sessions must not be multiplexed on the same bearer.

Backward compatibility is guaranteed, because user equipment UE that do not understand the new subtype ignore it and set up separate bearers and PDP contexts, respectively, for separate sessions.

A benefit of this implementation example is that the AF does not have to know about the bearer level multiplexing capabilities of the network. The capability indication is transported transparently from the PDF to the UE.

Secondly, the current session identifier (reference is made to IETF RFC 3520) is divided in two parts. One part currently used as the session identifier is used. The other part is used for identifying the "session grouping". In other words, the Session Identifier carries a value that is actually a concatenation of the values, one to indicate a session group, the other to indicate the session identifier.

Backward compatibility is guaranteed, because the new parameters are carried inside an already existing parameter.

In practice, the uniqueness of the parameter values compared to a current Session Identifier value (of networks supporting only intra-session multiplexing) can be achieved by making the parameter field long enough, e.g. by reserving four octets for both parameters.

A benefit of this implementation example is that AF does not have to know about the bearer level multiplexing capabilities of the network. The capability indication is transported transparently from the PDF to the UE.

The third principle is that a session specific attribute of the SDP (Session Description Protocol) is defined for indicating the inter-session multiplexing capability and the "session grouping". According to the rules of the SDP specification (see IETF RFC 2327), the attribute could be defined e.g. as "a=>sessiongroup>:<session-group-identifier>", where "a" is a session specific attribute, "sessiongroup" is the name of the attribute and "session-group-identifier" is the value of the parameter. The AF/P-CSCF sends the parameter to the user equipment UE in the SDP during the session establishment signalling.

Backward compatibility is guaranteed, because user equipment UE that do not understand the new attribute ignore it and set up separate bearers and PDP contexts, respectively, for separate sessions.

An important advantage of the present preferred embodiment of the invention is that it provides compatibility between non-multiplexing and multiplexing capable system elements such as user equipment and networks. Further, the present embodiment provides a capability for networks/operators to use and/or define application specific and application related multiplexing support. In addition, the multiplexing of separate sessions on the same PDP context as such saves network and user equipment UE resources, i.e. the number of available PDP contexts is limited.

Thus, included in the description above is a method of multiplexing different sessions using the same authorized contexts for media, comprising: distinguishing the sessions to be multiplexed, by a device; creating a new session on a control plane; indicating media flows of different sessions; and enabling the sessions to share the same authorized context for media, thus being multiplexed.

While it is described above what is presently considered to be the preferred embodiments of the invention, it is to be understood that the same is presented by way of example only, and that various modifications may be made without departing from the spirit and scope of the invention as defined in the appended claims.

The invention claimed is:

1. A method, comprising:
distinguishing different control plane sessions by a user equipment;
identifying media flows of a same application among the different control plane sessions by the user equipment by setting a service identifier;
sending the service identifier by the user equipment to a call state control function comprising a policy decision function;
authorizing quality of service for a user plane context by the policy decision function, wherein the authorized quality of service corresponds to the quality of service requested by a session requesting a highest quality of service, the quality of service being related to a guaranteed bit rate; and
enabling, by the policy decision function based on the service identifier, the different control plane sessions with media flows of the same application to share the same user plane context with the authorized quality of service to multiplex the different control plane sessions with media flows of the same application.

2. The method according to claim 1, further comprising:
updating a packet classifier filter of the user plane context by the policy decision function.

3. An apparatus, comprising:
a distinguishing processor configured to distinguish different control plane sessions;
an identification processor configured to identify media flows of a same application among the different control plane sessions by setting a service identifier; and
an address processor configured to address the service identifier to a policy decision function, wherein the identification processor is further configured to identify which session can be multiplexed by using the service identifier, and wherein the service identifier is configured to specify that media flows of different control plane session comprising a same service identifier can be multiplexed on a user plane context with an authorized quality of service, while media flows of control plane sessions comprising different service identifiers cannot be multiplexed on the user plane context with the authorized quality of service.

4. A method, comprising:
distinguishing different control plane sessions by a user equipment;
identifying media flows of a same application among the different control plane sessions by the user equipment by setting a service identifier;
identifying which session can be multiplexed by using the service identifier;
specifying that media flows of different control plane session comprising a same service identifier can be multiplexed on a user plane context with an authorized quality of service while media flows of control plane sessions comprising different service identifiers cannot be multiplexed on the user plane context with the authorized quality of service; and
addressing the service identifier to a policy decision function.

5. An apparatus, comprising:
a processor configured to authorize quality of service for a user plane context; and
a multiplexer configured to enable, based on a service identifier, different control plane sessions with media flows of a same application to share the same user plane context with the authorized quality of service to multiplex the different control plane sessions with media flows of the same application, wherein the authorized quality of service corresponds to the quality of service requested by a session requesting a highest quality of service, the quality of service being related to a guaranteed bit rate.

6. The apparatus according to claim 5, further comprising:
an updating processor configured to update a packet classifier filter of the user plane context.

7. A method, comprising:
authorizing quality of service for a user plane context by a policy decision function; and
enabling with a multiplexer, by the policy decision function based on a service identifier, different control plane sessions with media flows of a same application to share the same user plane context with the authorized quality of service to multiplex the different control plane sessions with media flows of the same application, wherein the authorized quality of service corresponds to the quality of service requested by a session requesting a highest quality of service, the quality of service being related to a guaranteed bit rate.

8. The method according to claim 7, further comprising:
updating a packet classifier filter of the user plane context.

9. A computer program embodied on a computer readable storage medium, the computer program being configured to control a processor to perform a process, the process comprising:
distinguishing different control plane sessions by a user equipment;
identifying media flows of a same application among the different control plane sessions by the user equipment by setting a service identifier;
sending the service identifier by the user equipment to a call state control function comprising a policy decision function;
authorizing quality of service for a user plane context by the policy decision function, wherein the authorized quality of service corresponds to the quality of service requested by a session requesting a highest quality of service, the quality of service being related to a guaranteed bit rate; and
enabling, by the policy decision function based on the service identifier, the different control plane sessions with media flows of the same application to share the same user plane context with the authorized quality of service to multiplex the different control plane sessions with media flows of the same application.

10. A computer program embodied on a computer readable storage medium, the computer program being configured to control a processor to perform a process, the process comprising:
distinguishing different control plane sessions by a user equipment;
identifying media flows of a same application among the different control plane sessions by the user equipment by setting a service identifier;
identifying which session can be multiplexed by using the service identifier;
specifying that media flows of different control plane session comprising a same service identifier can be multiplexed on a user plane context with an authorized quality of service, while media flows of control plane sessions comprising different service identifiers cannot be multiplexed on the user plane context with the authorized quality of service; and
addressing the service identifier to a policy decision function.

11. A computer program embodied on a computer readable storage medium, the computer program being configured to control a processor to perform a process, the process comprising:
authorizing quality of service for a user plane context by a policy decision function; and
enabling with a multiplexer, by the policy decision function based on a service identifier, different control plane sessions with media flows of a same application to share the same user plane context with the authorized quality of service to multiplex the different control plane sessions with media flows of the same application, wherein the authorized quality of service corresponds to the quality of service requested by a session requesting a highest quality of service, the quality of service being related to a guaranteed bit rate.

* * * * *